(12) United States Patent
O'Connell et al.

(10) Patent No.: US 9,745,965 B2
(45) Date of Patent: Aug. 29, 2017

(54) PRINTED ACTUATORS AND USES THEREOF

(71) Applicant: ARIZONA BOARD OF REGENTS ON BEHALF OF ARIZONA STATE UNIVERSITY, Scottsdale, AZ (US)

(72) Inventors: Mike O'Connell, Phoenix, AZ (US); Brett Yost, Gilbert, AZ (US); Takayuki Nosaka, Tempe, AZ (US); Chegwei Wang, Tempe, AZ (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 1128 days.

(21) Appl. No.: 13/839,700

(22) Filed: Mar. 15, 2013

(65) Prior Publication Data

US 2013/0269336 A1 Oct. 17, 2013

Related U.S. Application Data

(60) Provisional application No. 61/622,776, filed on Apr. 11, 2012.

(51) Int. Cl.
*F03G 7/00* (2006.01)

(52) U.S. Cl.
CPC .............. *F03G 7/00* (2013.01); *Y10T 428/19* (2015.01)

(58) Field of Classification Search
CPC ................................. F03G 7/00; Y10T 428/19
USPC ............ 60/527–529; 310/306–307; 29/25.35
See application file for complete search history.

(56) References Cited

U.S. PATENT DOCUMENTS

| | | | |
|---|---|---|---|
| 7,872,396 B2 * | 1/2011 | Chiang | F03G 7/005 310/311 |
| 8,076,829 B2 | 12/2011 | Chen | |
| 8,368,285 B2 * | 2/2013 | Chiang | F03G 7/005 310/311 |
| 8,384,271 B2 * | 2/2013 | Kwon | G02B 3/14 310/328 |
| 2010/0060109 A1 * | 3/2010 | Russell | H01L 41/193 310/363 |
| 2010/0213790 A1 | 8/2010 | Chen | |
| 2011/0012476 A1 | 1/2011 | Chen | |
| 2011/0094217 A1 | 4/2011 | Chen | |
| 2011/0234053 A1 | 9/2011 | Chen | |
| 2015/0155474 A1 * | 6/2015 | Tanimoto | H01L 41/083 310/332 |

OTHER PUBLICATIONS

Bar-Cohen Y., Electroactive polymers: current capabilities and challenges, Proc. SPIE vol. 4695, Smart Structures and Materials 2002: Electroactive Polymer Actuators and Devices, San Diego, CA, Mar. 17, 2002.

(Continued)

*Primary Examiner* — Hoang Nguyen
(74) *Attorney, Agent, or Firm* — Quarles & Brady LLP

(57) ABSTRACT

Printed active origami combines printed electronics with nanomaterial coated polymer based actuators to create active printed structures. The fabrication processes include the step of applying carbon nanomaterial coatings to polymeric films. Products produced by the processes include actuating materials, such as solid state actuators that can be used as active element(s) in a printable active origami robot.

4 Claims, 18 Drawing Sheets

(56) References Cited

OTHER PUBLICATIONS

Baughman R.H. et al., Carbon nanotube actuators. Science, 1999, pp. 1340-1344, vol. 284.
Chalopin Y. et al., Upper bound to the thermal conductivity of carbon nanotube pellets, J. Appl. Phys., 2009, pp. 084301-1-084301-5 vol. 105.
Chen L.Z. et al., High-Performance, Low-Voltage, and Easy-Operable Bending Actuator Based on Aligned Carbon Nanotube/Polymer Composites. ACS Nano, 2011, pp. 1588-1593, vol. 5, issue 3.
Collins P.G. et al., Engineering carbon nanotubes and nanotube circuits using electrical breakdown, Science, 2001, pp. 706-709, vol. 292, issue 5517.
Coluci V.R. et al., Mechanical properties of carbon nanotube networks by molecular mechanics and impact molecular dynamics calculations, Phys. Rev. B., 2007, pp. 075417-1-075417-7, vol. 75.
Demain E.D. and O'Rourke, J.O., "A Survey of Folding and Unfolding in Computational Geometry" in Mathematical Sciences Research Institute Publications, Aug. 2005, pp. 167-211, vol. 52, Cambridge University Press.
Demain E.D. and O'Rourke, J.O., Geometric Folding Algorithms: Linkages Origami Polyhedra, 2007, Cambridge University Press, pp. 381-437.
Dresselhaus M.S. et al., Electronic, thermal and mechanical properties of carbon nanotubes, Philos. Trans. R. Soc. A, 2004, pp. 2065-2098, vol. 362, issue 1823.
Ebefors T. et al., A walking silicon micro-robot, Transducers '99, The 10th International Conference on Solid-State Sensors and Actuators, Sendai, Japan, Jun. 7-10, 1999, pp. 1202-1205.
Hawkes E. et al., Programmable matter by folding. Proc. Natl. Acad. Sci. U.S.A. 2010, pp. 12441-12445, vol. 107, issue 28.
Hu Y. et al., Electromechanical Actuation with Controllable Motion Based on a Single Walled Carbon Nanotube and Natural Biopolymer Composite. ACS Nano, 2010, pp. 3498-3502, vol. 4, issue 6.
Jiang H. et al., Thermal expansion of single wall carbon nanotubes, J. Eng. Mater.-T. Asme., 2004, pp. 265-70, vol. 126, issue 3.
Juluri B.K. et al., A Mechanical Actuator Driven Electrochemically by Artificial Molecular Muscles. ACS Nano, 2009, pp. 291-300, vol. 3, issue 2.
Jung J.H. et al., Electro-active graphene-Nafion actuators, Carbon, 2011, pp. 1279-1289, vol. 49, issue 4.
Karpelson M. et al., Driving high voltage piezoelectric actuators in microrobotic applications. Sensor Actuat. a—Phys., 2012, pp. 78-89, vol. 176.
Kataura I.I. et al., Optical properties of single wall carbon nanotubes, Synthetic Metals, 1999, pp. 2555-2558, vol. 103.
Kim J. et al., Blocked force measurement of electro-active paper actuator by micro-balance, Sensor Actuat. a—Phys., 2007, pp. 401-06, vol. 133, issue 2.
Landi B.J. et al, Single Wall Carbon Nanotube Nafion Composite Actuators. Nano Lett. 2002, pp. 1329-1332, vol. 2, issue 4.
Lendlein A. and Kelch S., Shape-memory polymers, Angew. Chem. Int. Edit., 2002, pp. 2034-2057, vol. 41, issue 12.
Liu Y. et al., Linear artificial molecular muscles. J. Am. Chem. Soc., 2007, pp. 9745-9759, vol. 127, issue 27.
Lu S.X. and Panchapakesan B., Optically driven nanotube actuators, Nanotechnology, 2005, pp. 2548-2554, vol. 16, issue 11.
Maniwa Y. et al., Thermal expansion of single-walled carbon nanotube (SWNT) bundles: X-ray diffraction studies, Phys. Rev. B, 2001, pp. 241402-1-241402-2, vol. 64.
Mathews S.A. et al., Analysis and characterization of the laser decal transfer process, Proc. SPIE vol. 8244, Laser-based Micro- and Nanopackaging and Assembly VI., San Francisco, CA, Jan. 21, 2012.
O'Connell M.J. et al., Band Gap Fluorescence from Individual Single-Walled Carbon Nanotubes, Science, 2002, 593-596, vol. 297, issue 5581.
O'Connell M.J. et al., Reversible water-solubilization of single-walled carbon nanotubes by polymer wrapping, Chem. Phys. Lett., 2001, pp. 265-271, vol. 342, issue 3-4.
Onal C.D. et al., Towards printable robotics: Origami-inspired planar fabrication of three-dimensional mechanisms, IEEE International Conference on Robotics and Automation (ICRA), Shanghai, China, 2011, pp. 4608-4613.
Otero T.F. and Saniena J.M., Soft and Wet Conducting Polymers for Artificial Muscles., Adv. Mater.,1998, pp. 491-494, vol. 10, issue 6.
Otero T.F., Reactive conducting polymers as actuating sensors and tactile muscles, Bioinspir. Biomim., 2008, pp. 1-10, vol. 3, issue 3.
Paik J.K. et al, Robotic origamis: self-morphing modular robots. Proc. 2nd Int. Conf. on Morphological Computation, Venice, Italy, Sep. 2011.
Pelrine R. et al., High-speed electrically actuated elastomers with strain greater than 100%. Science, 2000, pp. 836-839, vol. 287, issue 5454.
Prasher R.S. et al., Turning Carbon Nanotubes from Exceptional Heat Conductors into Insulators, Phys. Rev. Lett., 2009, pp. 105901-1-105901-4, vol. 102.
Riethmuller W and Benecke W., Thermally Excited Silicon Microactuators IEEE Trans. Electron Devices, 1988, pp. 758-763, vol. 65, issue 6.
Rinzler A.G. et al., Large-scale purification of single-wall carbon nanotubes: process, product, and characterization, Appl. Phys. a—Mater., 1998, pp. 29-37, vol. 67, issue 1.
Sellinger A.T. et al., Electrothermal Polymer Nanocomposite Actuators. Adv. Mater., 2010, pp. 3430-3435, vol. 22, issue 31.
Shahinpoor M. et al., Ionic polymer-metal composites (IPMCs) as biomimetic sensors, actuators and artificial muscles—a review, Smart Mater. Struct., 1998, pp. R15-R30, vol. 7.
Shepherd R.F. et al., Multigait Soft Robot. Proc. Natl. Acad. Sci. U.S.A., 2011, pp. 108 20400 (2011).
Stellman P. et al., Dynamics of Nanostructured Origami, J Phys Condens Matter, 2007, pp. 932-949, vol. 16, issue 4.
Timoshenko S., Analysis of bi-metal thermostats. J. Opt. Soc. Am. Rev. Sci., 1925, pp. 233-255, vol. 11, issue 3.
Wu Z.C. et al., Transparent, conductive carbon nanotube films, Science, 2004, pp. 1273-1276, vol. 305, issue 5688.
Xiao L. et al., Flexible, Stretchable, Transparent Carbon Nanotube Thin Film Loudspeakers, Nano Lett., 2008, pp. 4539-4545, vol. 8, issue 12.

* cited by examiner

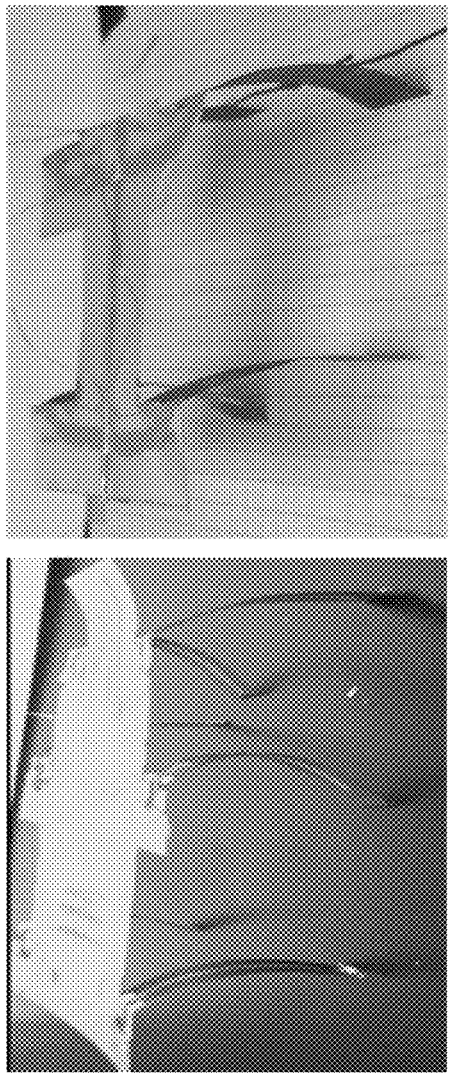

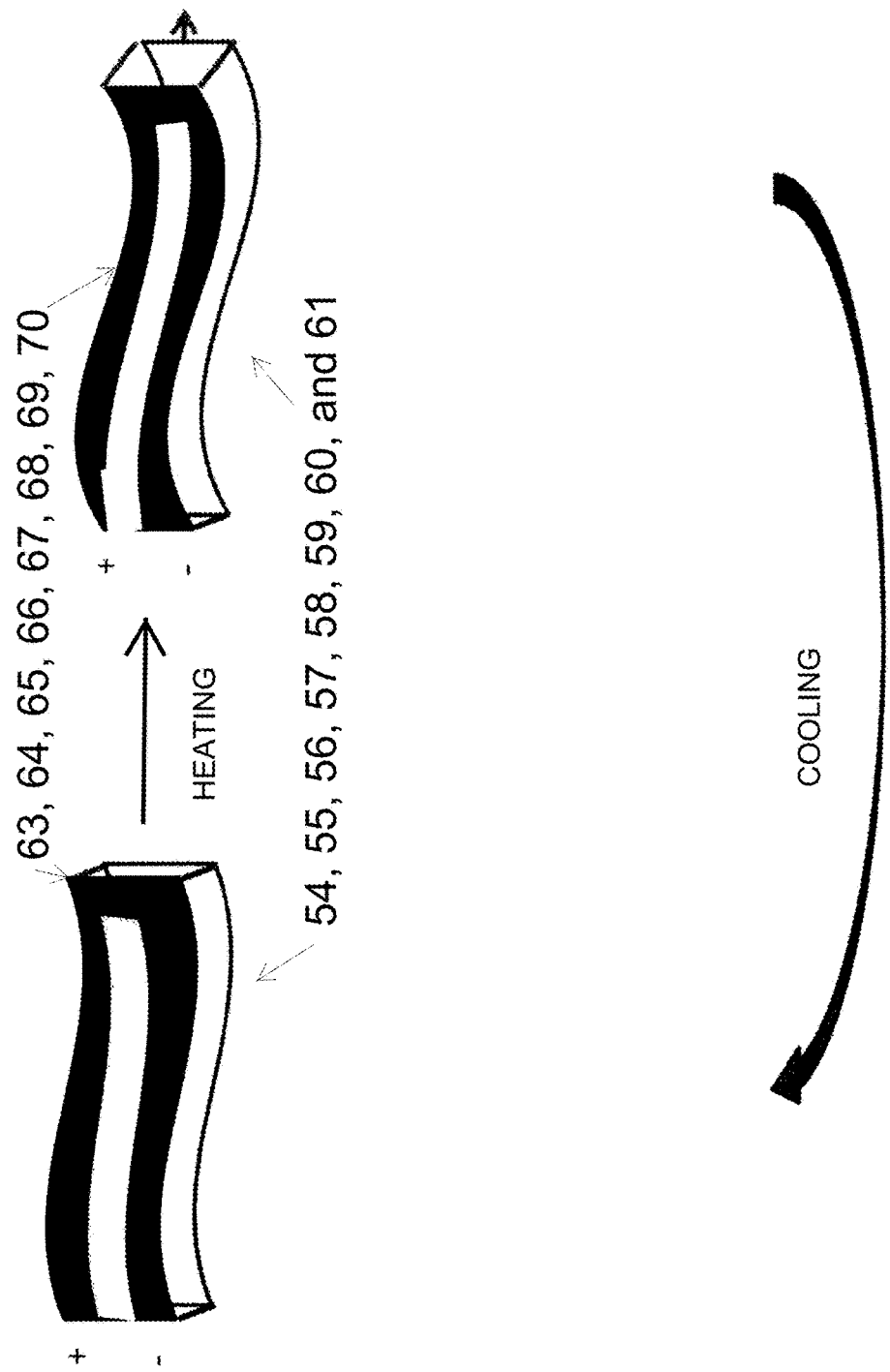

PRINTED ACTUATORS AND USES THEREOF

CROSS-REFERENCES TO RELATED APPLICATIONS

This application claims priority from U.S. Patent Application No. 61/622,776 filed Apr. 11, 2012.

STATEMENT REGARDING FEDERALLY SPONSORED RESEARCH

Not Applicable.

BACKGROUND OF THE INVENTION

1. Field of the Invention

The present disclosure relates to fabrication processes comprising application of certain carbon nanomaterial coatings to polymeric films. Products produced by invention processes include actuating materials, such as solid state actuators that can be used as active element(s) in a printable active origami robot.

2. Description of the Related Art

Polymer based actuators were demonstrated as electroactive devices or as shape memory plastics. See, for example, Bar-Cohen, "Electro-active polymers: current capabilities and challenges", Paper 4695-02, *Proceedings of the SPIE Smart Structures and Materials Symposium, EAPAD Conference*, San Diego, Calif., Mar. 18-21, 2002; Jung et al., "Electro-active graphene—Nafion actuators", Carbon 49 (2011) 1279-1289; and Otero et al., "Soft and Wet Conducting Polymers for Artificial Muscles", *Advanced Materials* 10(6), (1998), the disclosures of all of which are hereby incorporated by reference. Many electroactive polymers (EAPs) are based on a capacitor design and are not easily fabricated. Most EAPs are used for artificial muscle. The shape memory polymers commonly actuate only once when heated, unless they are forced out of shape again.

Walking robots have been developed. See Ebefors et al., "The 10th Int Conference on Solid-State Sensors and Actuators (Transducers '99)", Sendai, Japan, Jun. 7-10, 1999, pp 1202-1205.

Electrostrictive structures including a polymer matrix and carbon nanotubes are described in U.S. Pat. No. 8,076,829 and U.S. Patent Application Publication Nos. 2010/0213790, 2011/0012476, 2011/0094217, and 2011/0234053.

Origami-inspired devices are attractive because a single sheet can be folded into the desired shape, rather than trying to individually fabricate and attach together different components. With the help of geometric folding algorithms and computational tools to determine the folding patterns (see, Demaine et al. in *Combinatorial and Computational Geometry*, J. P. Jacob E. Goodman, Emo Ed. (2005), vol. 52, pp. 167-211; and Demaine et al. *Geometric Folding Algorithms: Linkages Origami Polyhedra*. (Cambridge University Press, 2007), pp. 472.), complex 3-D structures can be realized from 2-D forms (see, Stellman et al. Dynamics of Nanostructured Origami. *Journal of Microelectromechanical Systems* 16, 932 (2007) and Piqué et al. in *Laser-based Micro- and Nanopackaging and Assembly VI*. (Proc. SPIE 8244, San Francisco, Calif., USA, 2012), pp. 8244), essentially allowing for robots with any form, dimension, and feature to be designed. However, in order to make functional robots, or "active origami", actuation must be engineered into the origami structures.

Of the many different strategies for actuation, the thermal bimorph actuator is attractive. Actuators that operate on electrochemical double-layer capacitance (see, Baughman et al., Carbon nanotube actuators. *Science* 284, 1340 (1999); and Landi et al., Single Wall Carbon Nanotube Nafion Composite Actuators. *Nano Lett.* 2, 1329 (2002)) require an electrolyte, including ionic electroactive polymers (EAPs) (see, Y. Bar-Cohen, in *EAPAD Conference*. Proceedings of the SPIE Smart Structures and Materials Symposium San Diego, Calif., USA, 2002), vol. Paper 4695-02; and Y. Bar-Cohen, *Polymer (EAP) Actuators as Artificial Muscles: Reality, Potential, and Challenges*. (SPIE Publications, 2004), vol. PM136, pp. 765) and molecular switches (see, Liu et al., Linear artificial molecular muscles. *J. Am. Chem. Soc.* 127, 9745 (2005); and, B. K. Juluri et al., A Mechanical Actuator Driven Electrochemically by Artificial Molecular Muscles. *Acs Nano* 3, 291 (2009); and Pelrine et al., High-speed electrically actuated elastomers with strain greater than 100%. *Science* 287, 836 (2000)). Dielectric elastomers and piezoelectric actuators (see, Karpelson et al., Driving high voltage piezoelectric actuators in microrobotic applications. *Sensor Actuat. a-Phys.* 176, 78 (2012)) need high electric fields and voltages. Pneumatically-driven soft robots (see, Shepherd et al., Multigait Soft Robot. Proc. Natl. Acad. Sci. U.S.A. 108 20400 (2011)) require the use of compressed gas. A thermal bimorph actuator exploits the differences in thermal expansion coefficients between two materials, as shown in the classical example of a bimetal thermostat (see, Timoshenko, Analysis of bi-metal thermostats. *J. Opt. Soc. Am. Rev. Sci.* 11, 233 (1925)). Such electrothermally driven actuation has been demonstrated in microelectromechanical systems (MEMS) (see, Riethmuller et al., Thermally Excited Silicon Microactuators *IEEE Trans. Electron Devices* 35, 758 (1988)), carbon nanotube/polymer composites (see, Sellinger et al. Electrothermal Polymer Nanocomposite Actuators. *Adv. Mater.* 22, 3430 (2010); and Hu et al., Electromechanical Actuation with Controllable Motion Based on a Single Walled Carbon Nanotube and Natural Biopolymer Composite. *Acs Nano* 4, 3498 (2010); and Chen et al., High-Performance, Low-Voltage, and Easy-Operable Bending Actuator Based on Aligned Carbon Nanotube/Polymer Composites. *Acs Nano* 5, 1588 (2011)), self-folding sheets (see, Hawkes et al., Programmable matter by folding. Proc. Natl. Acad. Sci. U.S.A. 107, 12441 (2010); and Paik et al., in ICMC. (Venice, Italy, 2011)) and has recently been used to impart mobility (e.g. crawling) in a simple worm-like robot through the use of NiTi shape memory springs (see, Cagdas et al. in *IEEE (ICRA)*. (Shanghai, China, 2011)).

However, there is still a need for methods to integrate the actuator with the origami from a cost and fabrication perspective. Also, there is a need for methods that can make it easier to produce different robot designs to suit each particular need.

SUMMARY OF THE INVENTION

The present invention provides an article suitable for folding to fabricate a three dimensional structure. The article includes a flexible film including a body section, a first section joined to the body section, and a second section joined to the body section. The film comprises a polymeric material. The article also includes a first carbon nanomaterial coating disposed on the first section of the film thereby defining a first actuating portion of the article, and a second separate carbon nanomaterial coating disposed on the second section of the film thereby defining a second actuating portion of the article. The first carbon nanomaterial coating and the second carbon nanomaterial coating can each comprise carbon nanotubes selected from the group consisting of single-walled nanotubes, double-walled nanotubes, and mixtures thereof. The first section can be joined at a first bend line to the body section, and the second section can be joined at a second bend line to the body section.

The article can include a source of electricity in electrical communication with the first carbon nanomaterial coating and the second carbon nanomaterial coating. The source of electricity can be disposed on a surface of the body section of the film. The article can include a controller in electrical communication with the source of electricity and the first carbon nanomaterial coating and the second carbon nanomaterial coating. The controller can execute a stored program to supply electricity from the source of electricity to the first carbon nanomaterial coating and the second carbon nanomaterial coating. The controller and the source of electricity can be disposed on a surface of the body section of the film, and the controller and the source of electricity and the first carbon nanomaterial coating and the second carbon nanomaterial coating can be in electrical communication by way of electrical signal traces on the film. The traces can comprise a carbon nanomaterial. The controller can execute the stored program to first supply electricity from the source of electricity to the first carbon nanomaterial coating and to second supply electricity to the second carbon nanomaterial coating. The controller can execute the stored program to repeatedly cycle from first supplying electricity from the source of electricity to the first carbon nanomaterial coating and then second supplying electricity to the second carbon nanomaterial coating.

The article can include a source of heat in thermal communication with the first carbon nanomaterial coating and the second carbon nanomaterial coating. The article can include a source of light in communication with the first carbon nanomaterial coating and the second carbon nanomaterial coating.

The first carbon nanomaterial coating and the second carbon nanomaterial coating can each have a resistance of less than ten ohms per square. The first carbon nanomaterial coating and the second carbon nanomaterial coating can each be printed on the film.

The polymeric material can be selected from the group consisting of polyethylene, polypropylene, ethylene ethyl acrylate, ethylene vinyl acetate, fluoroethylene propylene, cellulose acetate, polyvinylidene fluoride, polyesters, polytetrafluoroethylene, polyamides, acetal, nylons, acrylonitrile butadiene styrene, polycarbonates, polyvinylchloride, polyimides, polyetheretherketone, polyethylene terephthalate, polymethyl methacrylate, and mixtures thereof. In one form, the polymeric material is selected from the group consisting of acetal and polyimides.

In one form of the article, the thermal expansion coefficient of the film and the first carbon nanomaterial coating are different, and the thermal expansion coefficient of the film and the second carbon nanomaterial coating are different. Preferably, a thermal expansion coefficient of the film is greater than a first thermal expansion coefficient of the first carbon nanomaterial coating, and the thermal expansion coefficient of the film is greater than a second thermal expansion coefficient of the second carbon nanomaterial coating.

A first ratio of the thickness of the first carbon nanomaterial coating and the film can be between about 1:200 to about 1:5, and a second ratio of the thickness of the second carbon nanomaterial coating and the film can be between about 1:200 to about 1:5. The film can have a thickness between about 0.0001 millimeters and about 2 centimeters. The first carbon nanomaterial coating and the second carbon nanomaterial coating can have a thickness between about 0.02 micrometers and about 4 millimeters.

The present invention also provides a three dimensional structure. The structure includes a flexible film including a body section and a first section joined to the body section. The film can comprise a polymeric material. The structure includes a first carbon nanomaterial coating disposed on the first section of the film thereby defining a first actuating portion of the structure. The film is folded at a first bend line at a first junction of the body section and the first section to create the three dimensional structure.

The film of the structure can include a second section joined to the body section, and the structure can further include a second separate carbon nanomaterial coating disposed on the second section of the film thereby defining a second actuating portion of the structure. The film is folded at a second bend line at a second junction of the body section and the second section to create the three dimensional structure.

In an embodiment of the structure, the body section of the film defines a body of a walking robot, and the first actuating portion of the structure defines a first leg of the walking robot, and the second actuating portion of the structure defines a second leg of the walking robot. The structure can include a source of electricity in electrical communication with the first carbon nanomaterial coating and the second carbon nanomaterial coating. The source of electricity can be disposed on the body of the walking robot. The structure can include a controller disposed on the body of the walking robot, and the controller and the source of electricity and the first carbon nanomaterial coating and the second carbon nanomaterial coating can be in electrical communication by way of electrical signal traces on the body of the walking robot. The traces can comprise a carbon nanomaterial. The controller can execute a stored program to repeatedly cycle from first supplying electricity from the source of electricity to the first carbon nanomaterial coating and then second supplying electricity to the second carbon nanomaterial coating. The structure can include a source of heat in thermal communication with the first carbon nanomaterial coating and the second carbon nanomaterial coating. The structure can include a source of light in communication with the first carbon nanomaterial coating and the second carbon nanomaterial coating.

In another embodiment of the structure, the body section of the film defines a body of a rotating device, and the first actuating portion of the structure defines a first leg of the rotating device, and the second actuating portion of the structure defines a second leg of the rotating device. The structure can include a source of heat in thermal communication with the first carbon nanomaterial coating and the second carbon nanomaterial coating. The structure can include a source of light in communication with the first carbon nanomaterial coating and the second carbon nanomaterial coating.

In an embodiment of the structure, the first carbon nanomaterial coating comprises carbon nanotubes selected from the group consisting of single-walled nanotubes, double-walled nanotubes, and mixtures thereof. A wide range of sheet resistances is possible. Preferably, the first carbon nanomaterial coating has a resistance of less than ten ohm per square. The first carbon nanomaterial coating can be printed on the film.

In an embodiment of the structure, the polymeric material is selected from the group consisting of polyethylene, polypropylene, ethylene ethyl acrylate, ethylene vinyl acetate, fluoroethylene propylene, cellulose acetate, polyvinylidene fluoride, polyesters, polytetrafluoroethylene, polyamides, acetal, nylons, acrylonitrile butadiene styrene, polycarbonates, polyvinylchloride, polyimides, polyetheretherketone, polyethylene terephthalate, polymethyl methacrylate, polybenzobisoxazole (available as Zylon®), p-phenylene benzobisthiazole, aramids (available as Kevlar®) and mixtures thereof. In one form, the polymeric material is selected from the group consisting of acetal and polyimides.

In an embodiment of the structure, the thermal expansion coefficient of the film and the first carbon nanomaterial coating are different. Preferably, a thermal expansion coefficient of the film is greater than a first thermal expansion coefficient of the first carbon nanomaterial coating. A first ratio of the thickness of the first carbon nanomaterial coating and the film can be between about 1:200 to about 1:5. The film can have a thickness between about 0.001 centimeters and about 2 centimeters. The first carbon nanomaterial coating can have a thickness between about 0.1 micrometers and about 4 millimeters.

In another aspect, the invention provides an actuator comprising at least one electroconductive product, wherein the electroconductive product is produced by a process comprising: (a) combining from about 0.1% to about 5.0% (w/vol) of an electroconductive material with a mixture comprising water and at least one $C_1$-$C_6$ alcohol; (b) sonicating the combination of step (a) for an effective period of time, thereby producing an electroconductive ink coating; and (c) applying the electroconductive ink coating on a polymeric substrate thereby producing an electroconductive product. In an embodiment, the polymeric substrate has a Young's modulus ranging from about 1 GPa to about 10 GPa. In a non-limiting embodiment, the electroconductive material is oxidized carbon nanotubes. In an embodiment, the mixture in step (a) comprises ethanol and water. In an embodiment, the polymeric substrate in step (c) comprises a film. In an embodiment, the film is an acetal film or a polyimide film. In an embodiment, the process further comprises filtering and/or centrifuging the sonication product of step (b) prior to performing step (c).

In an embodiment, the substrate in step (d) is not electroconductive, and the application of an electroconductive coating described herein imparts electroconductive properties to the previously non-electroconductive substrate. In another embodiment, the substrate in step (d) already has electroconductive properties, and the application of an electroconductive coating described herein enhances, modifies, and/or increases the electroconductive properties of the substrate.

In an embodiment, the electroconductive product is arranged to form an active origami device. In another embodiment, the active origami device is a robot powered by electricity, heat, and/or light. In another embodiment, the actuator is rotating. In another embodiment, the rotating actuator comprises at least one pair of vertex-intersecting parabolas, wherein the rotating actuator is light driven, and wherein each leg comprises the ink coated film.

The present disclosure also relates to a process for preparing an electroconductive product. The process comprises: (a) combining from about 0.01% to about 5.0% (w/vol) of an electroconductive material with a mixture comprising water and at least one $C_1$-$C_6$ alcohol, and optionally one or more amide solvents, and optionally one or more pyrrolidone solvents; (b) sonicating the combination of step (a) for an effective period of time, thereby producing an electroconductive ink coating; and (c) applying the sonication product of step (b) on a polymeric substrate whereby the product of step (c) is an electroconductive product. In an embodiment, the substrate had a Young's modulus ranging from about 1 GPa to about 10 GPa. In an embodiment, the process further comprises filtering and/or centrifuging the sonication product of step (b). In yet another embodiment, the process further comprises patterning the electroconductive material for the product of step (c). In an embodiment, the electroconductive material of step (a) comprises carbon nanotubes. In another embodiment, the carbon nanotubes are oxidized prior to use in step (a). In another embodiment, the mixture in step (a) comprises ethanol and water. In an embodiment, step (b) comprises sonicating at about 33% amplitude with about 600 watts.

In an embodiment, the substrate in step (d) is not electroconductive, and the application of an electroconductive coating described herein imparts electroconductive properties to the previously non-electroconductive substrate. In another embodiment, the substrate in step (d) already has electroconductive properties, and the application of an electroconductive coating described herein enhances, modifies, and/or increases the electroconductive properties of the substrate.

In an embodiment, the substrate of step (c) is a film, preferably an acetal film, such as an acetal homopolymer film, or polyimide film. In an embodiment, step (c) comprises applying the sonication product of step (b) on a substrate by stenciling, by silk screen printing, and/or by ink jet.

The present disclosure also relates to a process for making an electricity, heat, and/or light active origami device. The process comprises (a) arranging a plurality of actuators to form an active origami device, wherein at least one actuator comprises at least one electroconductive product; and (b) providing the active origami device with an electricity, heat, and/or light source. In an embodiment, the electroconductive product is produced by a process comprising: (i) combining from about 0.1% to about 5.0% (w/vol) of an electroconductive material with a mixture comprising water and at least one $C_1$-$C_6$ alcohol; (ii) sonicating the combination of step (i) for an effective period of time, thereby producing an electroconductive ink coating; and (iii) applying the sonication product of step (ii) on a polymeric substrate thereby producing the electroconductive product. In an embodiment, the polymeric substrate has a Young's modulus ranging from about 1 GPa to about 10 GPa.

In an embodiment, the electroconductive products are arranged to form an active origami device. In another embodiment, the active origami device is a robot powered by electricity, heat, and/or light.

In an embodiment where the active origami device is or part of a robot, the robot comprises two, four, six or eight legs, and wherein each leg comprises the electroconductive product. In another embodiment, the robot moves at least one centimeter per step. In another embodiment, the actuator exhibits durability of less than 10% change in generated force and resistance after at least 50,000 cycles. In another embodiment, the robot comprises a battery. In another embodiment, the robot further comprises a timer.

In an embodiment where the actuator is rotating, the actuator comprises at least one pair of vertex-intersecting parabolas, each parabola extends away from each other, each parabola comprises two legs, and each leg comprises the electroconductive product. In an embodiment, the rotating actuator has a rotational speed of about 5 seconds per cycle. In an embodiment, the rotating actuator is light driven.

The present disclosure also relates to processes for making an electroconductive ink coating. The process comprises (a) combining from about 0.1% to about 5.0% (w/vol) of an electroconductive material with a mixture comprising water and at least one $C_1$-$C_6$ alcohol; and (b) sonicating the combination of step (a) for an effective period of time; whereby the sonication product of step (b) is an electroconductive ink coating.

In an embodiment, the electroconductive material of step (a) comprises carbon nanotubes. In another embodiment, the carbon nanotubes are oxidized prior to use in step (a). In an embodiment, step (a) is combining about 0.3% (w/vol) oxidized carbon nanotubes with a mixture comprising water and at least one $C_1$-$C_6$ alcohol.

In an embodiment, the mixture in step (a) comprises ethanol and water. In another embodiment, the volume to volume ratio of ethanol to water is 1:1. In an embodiment, the water has electroconductivity of about 18 mega ohms/cm.

In an embodiment, step (b) is sonicating at about 33% amplitude with about 600 watts. In an embodiment, step (b) is sonicating from about 10 minutes to about 20 minutes. In an embodiment, the process further comprises: (c) filtering and/or centrifuging the sonication product of step (b).

The present disclosure also relates to processes for making an electricity, heat, and/or light generated robot. The process comprises (a) arranging a plurality of actuators to form an active origami device, wherein the actuator comprises at least one electroconductive product; and (b) providing the active origami device with a battery. In an embodiment, the electroconductive product is produced by a process comprising: (i) combining from about 0.1% to about 5.0% (w/vol) of an electroconductive material with a mixture comprising water and at least one $C_1$-$C_6$ alcohol; (ii) sonicating the combination of step (i) for an effective period of time, thereby producing an electroconductive ink coating; and (iv) applying the sonication product of step (ii) on a polymeric film having a Young's modulus ranging from about 1 GPa to about 10 GPa, thereby producing an electroconductive product.

In an embodiment, the robot comprises two, four, six or eight legs, and each leg comprises the electroconductive product. In an embodiment, the robot moves at least one centimeter per step. In an embodiment, the robot exhibits durability of less than 10% change in generated force and resistance after at least 50,000 cycles.

The present disclosure also relates to processes for making a rotating actuator. The process comprises (a) arranging a plurality of actuators to form at least one pair of vertex-intersecting parabolas, wherein each parabola extends away from each other, wherein each parabola comprises two legs, and wherein each leg comprises an electroconductive product.

In an embodiment, the electroconductive product is produced by a process comprising: (1) combining from about 0.1% to about 5.0% (w/vol) of an electroconductive material with a mixture comprising water and at least one $C_1$-$C_6$ alcohol; (2) sonicating the combination of step (1) for an effective period of time, thereby producing an electroconductive ink coating; and (3) applying the sonication product of step (b) on a film having a Young's modulus ranging from about 1 GPa to about 10 GPa, thereby producing an electroconductive product.

In an embodiment, the process further comprises providing the rotating actuator with a battery and/or timer. In an embodiment, the rotating actuator has a rotational speed of at least about 5 seconds per cycle. In an embodiment, the rotating actuator is light driven.

In one non-limiting example of the invention, we describe a facile fabrication of printed active origami using common plastic films and coatings of single-walled carbon nanotubes. A walking robot was made from a common plastic sheet coated with conductive inks. The conductive inks were printed onto plastic films, then cut with scissors, folded into a desired shape and activated by on-board, circuitry. Our solid-state actuators are multifunctional energy transducers powered by heat, light, or electricity. The maximum observed force produced by an actuator was 60× its own weight. Actuators were also demonstrated to bend more than 90 degrees. The actuators were repeatedly activated for nearly 50,000 cycles without significant loss of performance for a sub-hertz actuator and 1,000,000 cycles in the case of a 30 Hz actuator.

As described herein, we have developed active origami driven by electrothermal actuation from bilayers comprised of easily obtained carbon nanotube (CNT) materials printed onto common off-the-shelf plastic.

These and other features, aspects, and advantages of the present invention will become better understood upon consideration of the following detailed description, drawings and appended claims.

BRIEF DESCRIPTION OF THE DRAWINGS

FIG. 5A is a photograph of an example robot made using actuators according to the invention. The walking robot has a body with legs that were 3 cm.×1.5 cm.×0.0127 cm. The legs were bent in order to make the walking movement more effective.

FIG. 5B is a photograph of another example robot made using actuators according to the invention. The walking robot has a body wherein two groups of legs were controlled with Lab View through the 6009 DAQ and relay breakout board. A simple program of on and off times was tested.

FIG. 9 shows one actuation mechanism used in an actuator according to the invention.

Like reference numerals will be used to refer to like parts from Figure to Figure in the following description of the drawings.

DETAILED DESCRIPTION OF THE INVENTION

Figure 1:
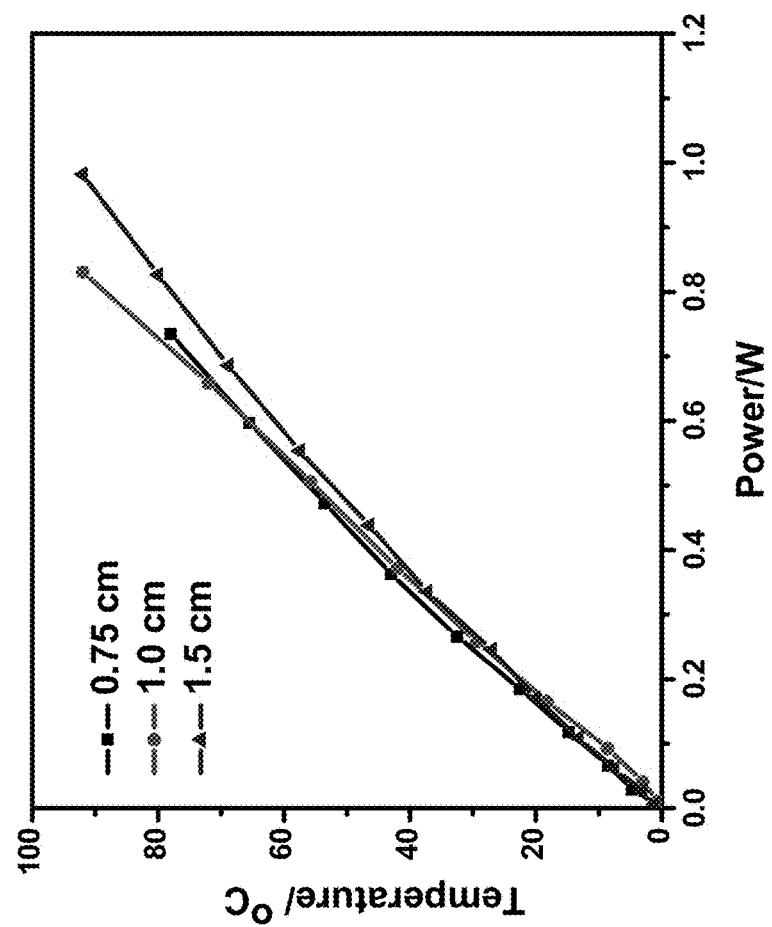
FIG. 1 is a graph showing the temperature power relationship of three samples, each having different widths. The graph in FIG. 1 shows that the temperature difference is linear with the power and the slopes of all three samples with different width are almost the same. The average slope is about 115° C./W.

Other than in the operating examples, or where otherwise indicated, all numbers expressing quantities of ingredients, reaction conditions and so forth used in the specification and claims are to be understood as being modified in all instances by the term "about". Accordingly, unless indicated to the contrary, the numerical parameters set forth in the instant specification and attached claims are approximations that may vary depending upon the desired properties sought to be obtained. At the very least, each numerical parameter should at least be construed in light of the number of reported significant digits and by applying ordinary rounding techniques.

Notwithstanding that the numerical ranges and parameters setting forth the broad scope of the instant disclosure are approximations, the numerical values set forth in the specific examples are reported as precisely as possible. Any numerical values, however, inherently contain certain errors necessarily resulting from the standard deviation found in their respective testing measurements.

It should also be understood that any numerical range recited herein is intended to include all sub-ranges subsumed therein. For example, a range of "1 to 10" is intended to include all sub-ranges between and including the recited minimum value of 1 and the recited maximum value of 10, that is, having a minimum value equal to or greater than 1 and a maximum value of equal to or less than 10.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this disclosure belongs.

As illustrated in the various figures, some sizes of structures or portions are exaggerated relative to other structures or portions for illustrative purposes and, thus, are provided to illustrate the general structures of the present invention. Furthermore, various aspects of the present subject matter are described with reference to a structure or a portion being formed on other structures, portions, or both. As will be appreciated by those of skill in the art, references to a structure being formed "on" or "above" another structure or portion contemplates that additional structure, portion, or both may intervene. References to a structure or a portion being formed "on" another structure or portion without an intervening structure or portion are described herein as being formed "directly on" the structure or portion.

Furthermore, relative terms such as "on", "above", "top", or "bottom" are used herein to describe one structure's or portion's relationship to another structure or portion as illustrated in the figures. It will be understood that relative terms such as "on", "above", "top", or "bottom" are intended to encompass different orientations of the device in addition to the orientation depicted in the figures. For example, if the device in the figures is turned over, structure or portion described as "above" other structures or portions would now be oriented "below" the other structures or portions. Likewise, if devices in the figures are rotated along an axis, structure or portion described as "above", other structures or portions would now be oriented "next to" or "left of" the other structures or portions.

With respect to the present disclosure, the term "oxidized" as used herein is intended to refer to any material treated with oxidative substance(s). For instance, oxidation can be performed by refluxing a material, such as a carbon nanotube, in nitric acid so as to produce an oxidized carbon nanotube.

With respect to the present disclosure, the phrase "electroconductive material" as used herein is intended to refer to any material having a conductivity of $10^3 \, \Omega^{-1} m^{-1}$ or greater. In a preferred embodiment, the electroconductive material comprises at least one carbon nanotube. In another embodiment, the electroconductive material comprises grapheme, which is a flat sheet. In another embodiment, the electroconductive material comprises silver or gold nanowires. Electroconductive materials treated according to processes described herein can be deposited as an ink onto a polymeric film, such as by film transfer.

With respect to the present disclosure, the terms "arrange", "arranged", and "arrangement" can be used interchangeably and is intended to refer to any manner of shaping, folding, arranging, positioning, modulating, sorting, systemizing, classifying, organizing, and/or ranking so as to achieve the intended effect. The terms "arrange", "arranged", and "arrangement" can include one or more of the above noted active steps. For example, when used in the context of the phrase "ink coated polymeric films are arranged to form an active origami device", the term "arranged" can be understood as folding and positioning ink coated polymeric film in a manner known to one of skill in the art so as to form an active origami device.

By "three dimensional structure", we mean a structure having a shape other than a generally flat sheet. In other words, the thickness of a generally flat sheet would not be considered to be the third dimension of a generally flat sheet (in addition to the length and width).

Described herein is a facile process for the fabrication of printable active origami using polymeric films and electrically conducting films of single-walled carbon nanotubes. Solid state actuators of the invention are much akin to bimetal thermostats, but can be powered by heat, light or electricity. Maximum performance observed by an actuator according to an embodiment of the invention lifted 60× its own weight, which was approximately 50% of the calculated maximum. In an embodiment, actuators according to the invention were cycled 50,000 times without significant loss of performance in the case of a sub hertz actuator and 1,000,000 cycles in the exemplary embodiment of a 30 Hz actuator. Calculated performance data indicates that actuators in an embodiment of the invention match the performance of well-established electroactive polymers or artificial muscle. These invention actuators were patterned on coated polymeric sheets folded into devices and powered to function as desired.

Also described herein is a class of actuating materials fabricated with polymeric films and carbon nanomaterials. According to invention processes, patterning techniques can be used to produce inexpensive solid state printed and active origami. Actuators of the invention do not need solvents to operate or special polymers, unlike most polymer based actuators. Invention actuators were rapidly fabricated using efficient techniques, are light weight and extremely inexpensive (i.e., disposable). The flexibility of the carbon nanomaterial coating far exceeds that of traditional conductors and forms strongly adherent coatings/patterns directly onto a wide variety of materials. The carbon nanomaterial inks can be deposited by many deposition types allowing both patterning by additive and subtractive methods.

Described herein is the fabrication of actuators using polymeric films and coatings of carbon nanotubes. The actuators were characterized by measuring the force generated for a given power, the max force before failure, the curvature (deflection) as a maximum and during high cycling runs, cycling rates and durability testing produced impressive data. Use of the actuators as the active element in a printed origami robot is demonstrated herein. Active origami can move, walk, open, close or rotate when powered to do so. The origami devices were powered by electricity, heat, and or light.

The actuation process observed by invention actuators can be understood as an elongation of polymeric film during heating in which bending is caused by (i) high van der Waals adhesion, and (ii) low thermal expansion of carbon nanotubes that are constrained on one side of the polymeric material. This is analogous to a bimetal actuator. The unique combination of characteristics that comprise this actuation system creates one of the most facile, yet versatile fabrication methods for creating printed active origami.

This work will give scientists and engineers new tools for active printed electronic systems. The actuators give an advantage in that they are lightweight, low cost, and enable rapid prototyping. Designs can be created with CAD programs and printed in real time. These new devices might find great utility in many areas. The lightweight aspect might allow new satellites and space exploration vehicles to be created at much lower costs of development and deployment. Other innovations will benefit from printed multifunctional and adaptive structures, such as small aircraft design and construction, robotics that are created on demand and 3-D self-folding electronics—all from common polymeric films.

I. Ink Coatings & Processes for Making Ink Coatings

A. Electroconductive Material

Example methods presented herein comprise combining an electroconductive material with a solvent such as a mixture comprising water and at least one $C_1$-$C_6$ alcohol. In a preferred embodiment, the electroconductive material is carbon nanotubes that are oxidized.

Any carbon nanotubes can be used in invention methods. The carbon nanotubes can be selected from single-walled nanotubes, double-walled nanotubes, and mixtures thereof. For example, commercially available carbon nanotubes, such as those available through Carbon Solutions, Inc. can be used. In a preferred embodiment, P3 carbon nanotubes obtained through Carbon Solutions, Inc. were used. These carbon nanotubes were made in an arc reactor. Because carbon species other than carbon nanotubes can be made during the synthesis process, an extra purification step was performed to remove amorphous carbon by refluxing in nitric acid. The process left some glassy carbon and nanotubes with carboxylic acid groups and other oxygen species on the surface. This oxygen functionalization rendered the nanotubes less hydrophobic and easier to disperse, when compared to un-functionalized tubes or CVD grown nanotubes.

B. Solvent Mixtures

According to methods presented herein, an electroconductive material is combined (i.e., mixed) with a solvent such as water and at least one $C_1$-$C_6$ alcohol. In a preferred embodiment, electroconductive materials are combined with water and at least one $C_1$-$C_6$ alcohol in a 1:1 ratio. In a preferred embodiment, water having an electroconductivity of about 18 mega ohms/cm can be used. In a preferred embodiment, the $C_1$-$C_6$ alcohol is ethanol. Acetone, ethers, and other alcohols may also be used.

C. Sonication

After mixing 1-5% of carbon nanotubes by volume weight with a mixture of ethanol and water (50%), the resultant mixture is sonicated according to processes herein. Sonication can be performed using any known sonication methods for an effective period of time.

With respect to the present disclosure, the phrase "effective period of time" as used herein is intended to refer to any period of time sufficient to achieve the effect intended. In the context of the sonication step of methods presented herein, the effective period of time for sonication is the amount of time sufficient to achieve the desired viscosity of the ink coating as determined by visual observation. An ideal consistency for the ink coating is that of acrylic paint, not thick like a paste nor thin like water.

In a preferred embodiment, sonication at 33% amplitude for 25 minutes using a Cole-Parmer CPX600, 600 W sonicator was performed. If phase separation is noted, other formulations can be made.

In another embodiment, nanotubes at 0.1-5% (w/vol) were placed in an aqueous solution containing 1% sodium dodecyl sulfate (SDS) or sodium dodecyl benzene sulfate (SDBS) and processed as described in O'Connell et al., *Science* 26 Jul. 2002: Vol. 297 no. 5581 pp. 593-596, the disclosure of which is incorporated herein by reference.

D. Filtration/Centrifugation

In an embodiment of processes herein, a light centrifugation step is performed following sonication to remove large bundles of nanotubes. In another embodiment, filtration can be used as an alternative method to remove large bundles of nanotubes. Some degree of phase separation was noted.

The normal upper limit for aqueous dispersions of carbon nanotubes is around 1 gram per liter (0.1% by volume wt). In an embodiment of processes herein, an ink coating is formulated to address the phase separation. In this embodiment, nanotubes are lightly functionalized by microwave assisted derivativization using the ylide reaction. Nanotubes are functionalized following known methods. Nanotubes prepared according to this embodiment are found to disperse in N-methylpyrrolidone (DMSO or other solvent that works well with carbon nanotubes), alcohol (ethanol or isopropanol), and water.

E. Features of Ink Coatings

Changes of conductivity after functionalization as described above are measured by methods below.

Dispersion Tests and Metrics:

Varying degrees of dispersion can be observed without any magnification. Dispersions passing the unaided eye test were then placed in a capillary tube for further examination. Qualitative optical examinations were performed under a microscope using a 10× or greater objective. The degree of phase separation and size of particles are be characterized. Samples with higher uniformity are filtered or centrifuged to remove large particles.

Viscosity:

Deposition techniques require different viscosity inks. Dispersions with varying viscosities were chosen for a given technique. Pastes were selected as being most useful for the initial device work, as stencils (made from scotch tape) were used to pattern the deposited nanotubes. Viscosity is measured by known techniques.

Wetting

Ink coatings that were able to wet the polymeric film substrates for uniform coatings were selected. The contact angle are measured for inks to guide the formulation. Meyer rod or doctor blade coatings are used to determine the wetting characteristics. Coatings using the solvents and any added surfactants or polymers are drawn over the polymeric film and dried with a heat lamp or heat gun (for pastes). Nanotubes or dyes are added to the inks being tested for visualization after drying. Selected inks did not de-wet the polymeric film.

Final selections for inks are made by comparing the wetting characteristics, conductivity, and dispersion quality. Inks are selected based on these criteria. Additionally, the polymeric films are modified to modify the surface layer's affinity for the solvents being tested. Hydrophilic modifications are selected as being the best choice for increased wetting and lower contact angles.

Adhesion

Adhesion is an important part of the mechanism behind the actuation produced by devices and processes herein. Tape tests were performed to determine the adhesion characteristics (ANSI standards). Adhesion is increased by oxygen plasma treating the substrate. Polymer binders are used to increase the adhesion.

II. Ink Coated Polymeric Films

A. Polymeric Films

According to processes herein, one can use any polymeric film having a linear thermal coefficient of expansion higher then the linear thermal expansion coefficient of a carbon nanotube coating. Non-limiting example polymeric films have a linear thermal coefficient of expansion of about $10 \times 10^{-6}$ mm/mm K to about $300 \times 10^{-6}$ mm/mm K. The two polymers we prefer are: Kapton® polyimide film (linear thermal coefficient of expansion=$55 \times 10^{-6}$ mm/mm K), and acetal (linear thermal coefficient of expansion=$110$–$150 \times 10^{-6}$ mm/mm K, in one form $137 \times 10^{-6}$ mm/mm K). Non-limiting example polymeric films have a glass transition temperature ranging from about 40° C. to about 500° C. Kapton® polyimide film has a glass transition temperature of about 450° C. Acetal has a glass transition temperature of about 120° C. According to processes herein, any polymeric film having a Young's modulus ranging from about 1 GPa to about 10 GPa can be used.

In a preferred embodiment, polymeric films composed of acetal homopolymers are used, such as those sold under the name Delrin® by DuPont™. In another embodiment, polymeric films composed of polyimides are used, such as those sold under the name Kapton® by DuPont™. In yet another embodiment, polymeric films composed of polypropylene are used.

Preferred polymeric films to be used in the present processes are rigid to support some weight, elastic for repeated actuation cycles, and have a low heat capacity (less energy to cycle).

Non-limiting example polymeric films that can be used according in the methods of the invention are shown in Table 1 below.

TABLE 1

| Polymer | Linear Thermal Expansion Coefficient (Value × $10^{-6}$ mm/mm K) |
|---|---|
| Ethylene ethyl acrylate (EEA) | 205 |
| Polyethylene (PE) | 200 |
| *Polypropylene (PP), unfilled | 100-200 |
| Ethylene vinyl acetate (EVA) | 180 |
| Fluoroethylene propylene (FEP) | 135 |
| Cellulose acetate (CA) | 130 |
| Polyvinylidene fluoride (PVDF) | 127.8 |
| Polyester (not PET) | 123.5 |
| PTFE Polytetrafluoroethylene (Teflon) | 112-125 |
| Polyamide (PA) | 110 |
| Acetal | 110-150 |
| Nylon, Type 6, cast | 85 |
| Polymethyl methacrylate (PMMA) sheet, cast | 81 |
| ABS (Acrylonitrile butadiene styrene) | 73.8 |
| Polycarbonate (PC) | 70.2 |
| PVC Polyvinylchloride | 70 |
| PET Polyethylene terephthalate | 70 |
| Polyimide (Kapton ®) | 55 |
| PEEK Polyetheretherketone | 25-50 |

B. Application & Patterning Methods

According to processes herein, ink coatings prepared herein are applied on a suitable polymeric film. Application can be achieved using any known method including flexographic spray, silk screen, printed resists, laser ablation, chemical etch, inkjet printing, spray painting, dip coating, spin coating, knife coating, kiss coating, gravure coating, pad printing, and other types of printing or roll coating. The solvent may be removed by normal processes such as air drying, heating or reduced pressure to form the desired coating of nanotubes. Alternatively, a film structure of the coating may be laminated to the polymeric film.

The nanotube coating thickness can be used to determine the conductivity. The coatings were opaque, so optical methods for measuring thickness were not useful. SEM imaging is used to determine the thickness of the nanotube layer.

C. Features of Ink Coated Polymeric Films

We measured the total resistance and then divided by the number of squares in the u-shaped nanotube coating on the actuator. The results were usually 10's of ohms per square.

III. Actuators

A. Features, Advantages

Actuators described herein comprise ink coated polymeric film. The present actuators provide new tools for active printed electronic systems. The actuators provide an advantage in that they are light weight, low cost, and enable rapid prototyping. Designs can be created with CAD programs and printed in real time. These new devices find great utility in many areas. The light weight aspect might allow new satellites and space exploration vehicles to be created at much lower costs of development and deployment. Other innovations will benefit from printed multifunctional and adaptive structures, such as small aircraft design and construction, robotics that are created on demand and 3-D self-folding electronics—all from common polymeric films.

B. Actuation

The actuation can be understood by elongation of the polymeric film during heating with the bending being caused by the high van der Waals adhesion and low thermal expansion of the carbon nanotubes constraining one side of the polymeric film. This is analogous to a bimetal actuator. The unique combination of characteristics that comprise exemplary actuation system creates one of the most facile, yet versatile fabrication methods for creating printed active origami.

C. Applications

The present actuators can be utilized in a variety of applications. For example, actuators herein can be used to create moving devices, including robots and rotating devices as described in detail in the non-limiting Examples below.

EXAMPLES

The following Examples are provided in order to demonstrate and further illustrate certain embodiments and aspects of the present invention and are not to be construed as limiting the scope thereof.

Example 1

Nanotubes used for coatings were dispersed in solvents to make an ink solution. P3 carbon nanotubes were obtained through Carbon Solutions. These nanotubes were oxidized, which rendered them less hydrophobic and easier to disperse when compared to un-functionalized or CVD-grown nanotubes. Inks were made by mixing and then sonicating 0.1-5% (~0.3% is preferred) of carbon nanotubes by volume weight with a 1:1 mixture of ethanol and water (27.4725 mL of a 91% ethanol mixture and 22.275 mL of nanopure water (18.02 mega ohms/cm). The solution was then sonicated to disperse the carbon nanotubes. It was sonicated at 33% amplitude for 25 minutes using a Cole-Parmer CPX600, 600 W sonicator (at pulse model: on/off time are 1 s/1 s, sonicate about 3 times, each time 5 minutes) The time chosen was based on visual observations of the viscosity; an ideal ink is the consistency of acrylic paint—not thick like a paste nor thin like water. A light centrifugation step was performed in some cases to remove large bundles of nanotubes.

Figure 4:
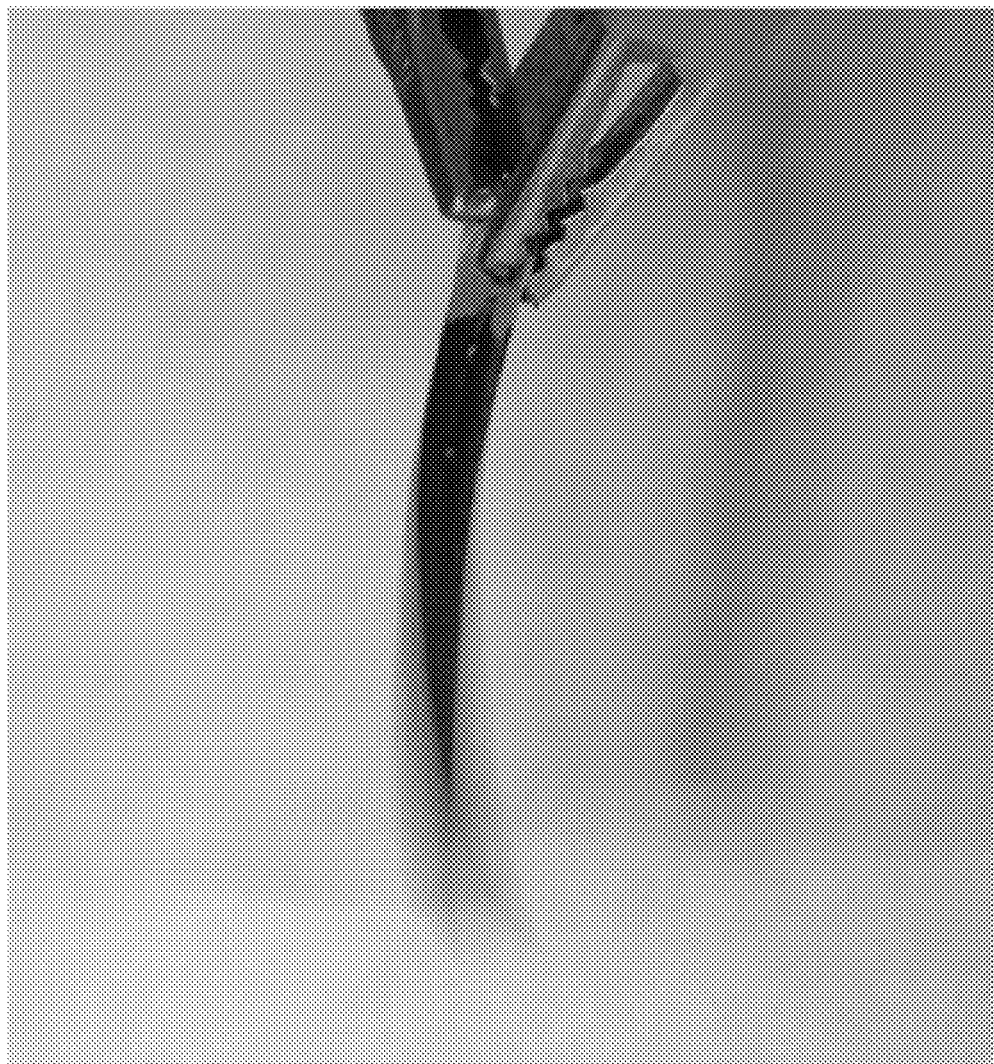
FIG. 4 is a photograph of a robot's legs according to the invention, in which the voltage used was much higher than the normal working voltage (15-30V), the on/off time was decreased to tens of milliseconds resulting in a heat pulse during each cycles that made the actuator vibrate fast (20-100 Hz). The durability of these fast cycling actuators according to the invention was also tested. The exemplary actuator cycled 1,000,000 times at 30 Hz without any obvious change.

Nanotube inks were deposited on polymeric films by several methods. Patterning was achieved by using stencils, silk screen printing methods and ink jet. The polymeric substrate was cleaned with acetone or ethanol and dried with compressed air. Actuators were made by cutting scotch tape to form a stencil on the polymeric film and then nanotube inks were poured in for low viscosity inks or scooped in with a spatula for the high viscosity inks. The ink was then allowed to self-level to the thickness of the tape and dried with a heat gun. Multiple coatings were used to lower the sheet resistance typically to the single digit ohms per square range, although, sub ohm per square coatings were possible. An example of an actuator made by this method is shown in FIG. 4.

Polymeric films were selected based on several criteria. Films with a Young's modulus between about 1 GPa to about 10 GPa were selected, because the rigidity allowed the film to be bent into desired shapes that support their own weight (origami). Various thicknesses of films with high linear thermal coefficients of expansion and relatively higher glass transition temperatures were tested for actuation. All polymeric films tested, including films not meeting the criteria, produced force and movement. Acetal and Kapton® films were favored for their performance.

The experimental results matched the theoretical predictions. The Timoshenko beam theory calculation as follows was used to determine the force and curvature for many polymeric films.

$$F = \frac{3EI}{2l\rho} \quad (1)$$

$$\frac{1}{\rho} = \frac{6\Delta\alpha\Delta T(1+m)^2}{h\left(3(1+m)^2 + (1+mn)\left(m^2 + \frac{1}{mn}\right)\right)} \quad (2)$$

I donates area moment of inertia, for a rectangle cross section area $I=(wh^3)/12$,
$\rho$ is the curvature of the actuator,
E is the modulus of the actuator—(in this case it is the average of the modulus of the nanotube coating and the polymeric film),
W is the width of the actuator,
h is the thickness of the actuator,
l is the length of the actuator,
m is the ratio of the thickness of carbon nanotube coating and the polymeric film,
n is the ratio of the modulus of carbon nanotube coating and the polymeric film,
$\Delta\alpha$ is the expansion coefficient difference between the nanotube coating and the polymeric film,
$\Delta T$ is the temperature difference between the actuator and the environment.

Letting, $$k = \frac{(1+m)^2}{\left(3(1+m)^2 + (1+mn)\left(m^2 + \frac{1}{mn}\right)\right)} \quad (3)$$

$$\text{Then, } F = k\frac{Ewh^2}{8l}\Delta\alpha\Delta T \quad (4)$$

From FIG. 1, it was found that the temperature difference is linear with the power and the slopes of all the three samples with different width are almost the same. And the average slope is about 115° C./W. So, $$\Delta T \approx 115P \quad (5)$$

P is the power supplied for the actuators
Then substituting equation (5) in equation (4), we get $$F = k\frac{Ewh^2}{8l}\Delta\alpha * 115P \quad (6)$$

In the Example described herein: $E_{acetal} \approx 2.6$ GP, $E_{carbon} = 10\text{-}15E_{acetal}$,
taking $E_{carbon} = 12E_{acetal}$ then n=12 in $\rho$, $\alpha_{acetal} = 137 \times 10^{-6}/$K,
Since $\alpha_{nanotubes} \ll \alpha_{acetal}$, so $\Delta\alpha \approx \alpha_{acetal}$ l=3 cm, w=1.0 cm, $h_1$=0.127 mm, according to the SEM image, the thickness of the carbon nanotube film is about 1/100 of the thickness of the plastic. So, m=0.01. Then k=0.494, $$F = 1.392\frac{g}{W} * \text{Power}$$

$$h_2 = 0.254 \text{ mm} = 2h_1,$$

Then k=0.293

$$F_2 = \frac{h_2^2}{h_1^2} * \frac{k_2}{k_1} F_1 = 3.301\frac{g}{W}\text{Power}$$

$$h_3 = 0.0762 \text{ mm } k = 0.681$$

$$F_3 = \frac{h_3^2}{h_1^2} * \frac{k_3}{k_1} F_1 = 0.692\frac{g}{W}\text{Power}$$

The force of an actuator positioned as a cantilever was measured with a Mettler XP205 balance connected to the computer for data acquisition using Lab View. Actuation was also controlled through Lab View via data acquisition card (NI USB-6009 DAQ) connected to a relay breakout board and DC power supply. The DAQ also recorded the signal from a voltage divider circuit, which monitored the actuators' resistance with time.

Figure 2:
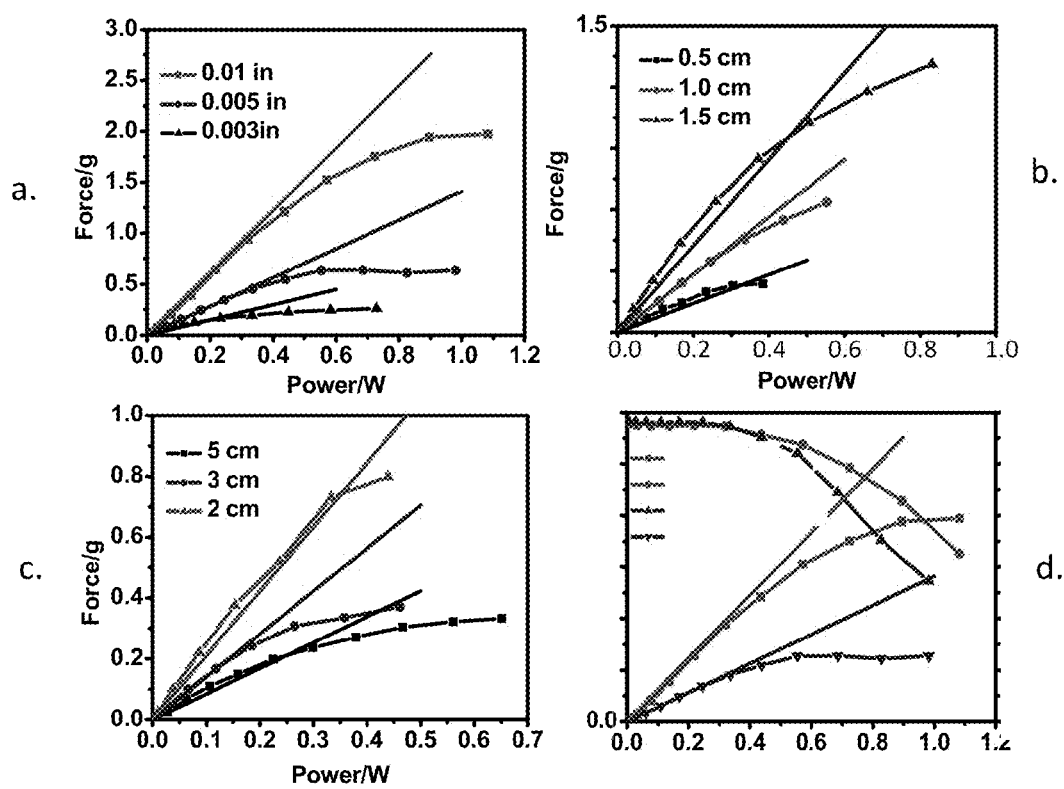
FIG. 2 are graphs showing the modulus change with power. The upper two graphs (FIG. 2a (upper left graph) and FIG. 2b (upper right graph)) are the modulus curves, while the lower two graphs ((FIG. 2c (lower left graph) and FIG. 2d (lower right graph)) curves are the theoretical and experimental force of the actuators. Thickness test data was used as an example to test the change in modulus with temperature. Tests conducted herein find that the modulus keeps decreasing at high temperatures, and these results are shown in the graphs of FIG. 2. The graph in FIG. 2a illustrates the measured and theoretical force of different thickness. The graph in FIG. 2b illustrates the measured and theoretical force of different lengths. The graph in FIG. 2c illustrates the measured and theoretical force of different width.

The dimensional dependence of the force is shown in FIG. 2. Various lengths (2, 3, 5 cm.), widths (0.5, 1, 1.5 cm.) and thicknesses (0.00762, 0.0127, 0.0254 cm.) of samples were prepared. The sample with 3 centimeter length, 1 centimeter width and 0.0127 centimeter thickness is considered as the standard sample size used for the robot legs. Testing was conducted by powering for actuator for 30 seconds in 1 volt increments to reach the equilibrium temperature ($T_{max}$) for the lower voltages and hence powers. However, 30 seconds heating time at higher voltages, when temperatures were close to the $T_g$, induced polymer chain relaxation and structural changes. The actuator was allowed to cool for 30 seconds to ensure a full return to room temperature. All measurements were conducted three times for each step and the average value was calculated. Then power was calculated with the equation above at each voltage, and the maximum force at each voltage was plotted versus power, as shown in FIG. 2. The measured and calculated forces fit each other very well at low power (low temperature). However, with the power or temperature increasing, the measured force starts to drop from the theoretical value. This might be caused by the change of the modulus with temperature. The thickness test data was used as an example to show the change in modulus with temperature. It shows that the modulus keeps decreasing at high temperature which is shown in FIG. 2d.

The experimental data and calculations show that the max force for a given actuator will be obtained for a thick and short design. Conversely, the calculation also shows that longer and thinner designs will demonstrate greater curvature. A 2 cm.×2 cm.×0.0254 cm. actuator was fabricated that developed more than 9 grams force; which was 60 times its own weight and was still much less than is theoretically possible. Another actuator measuring 5 cm.×1 cm.×0.0127 cm. sample was able to bend more than 90 degrees. The max cycling rate was also tested. Actuators were able to cycle to the limit of our relays (30-100 Hz). The voltage much was adjusted to heat the samples quickly. 15-30V was used and the on/off times were tens of milliseconds. The cycling rate is intrinsically limited by the thermal conductivity of the polymer and the film's thickness. The nanotube coating does affect the cooling rate to some degree. Nanotube coated polymeric films were compared to bare films after reaching a 50° C. in an oven for several minutes with a thermal camera. The nanotube coated sample cooled faster. This is expected given the higher surface area the nanotube coating provides. The thermal conductivity of a nanotube network is strikingly lower than an individual or small bundle of tubes.

An interesting observation was made during actuator testing that the device actually bends the wrong way for a brief moment. The actuation normally works when the polymeric film is heated and expands. The nanotube coating's strong adhesion to the polymer does not allow one side to expand, so the device curves towards the nanotube coating. The nanotubes also act as a resistive heater, when electricity is applied. The nanotubes can also absorb light and convert it to heat. The mechanism of heat actuation was tested by placing nanotube coated polymeric films and uncoated control films in an oven. The bending was always towards the nanotube coating. However, the electricity powered heating made the film bend the wrong way for a very short period of time. There are two possible causes for this: (1) the nanotubes expand when current is passed through them, and/or (2) the nanotubes heat rapidly, expand and thereby bend the film away from the nanotubes, just before the polymeric film is heated.

Figure 3:
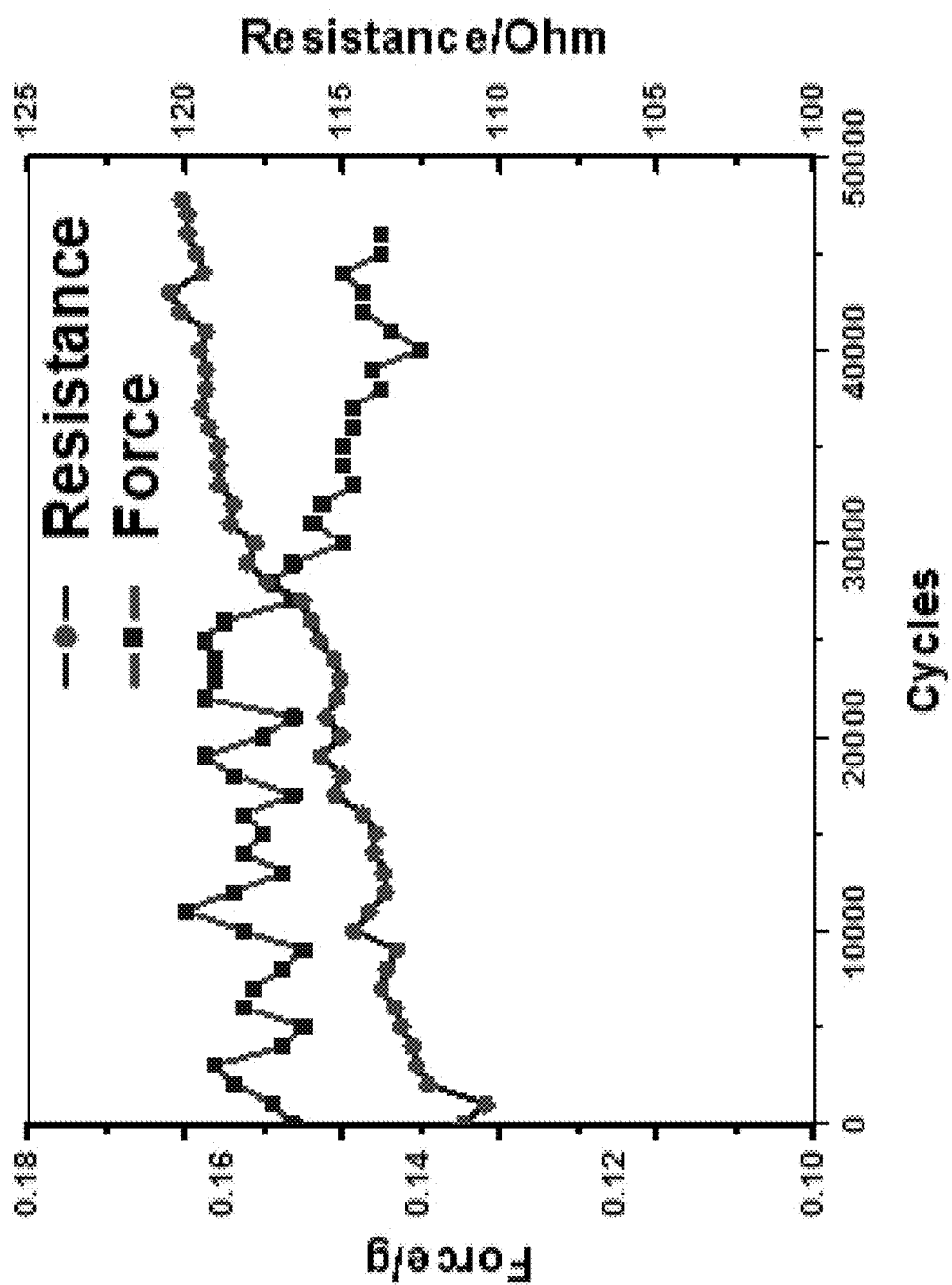
FIG. 3 is a graph illustrating results of a durability test conducted in an example walking structure developed with the force needed to carry the weight of batteries, circuits, and the structure itself. The example walking structure moved 1 cm per step (so that 50K cycles would equal 0.5 Km), and other features demonstrated by the example walking structure were based on the minimum requirements for a robot needed to achieve for the Google lunar x-prize (see http://www.googlelunarxprize.org/). The graph of FIG. 3 shows that the example walking structure successfully demonstrated 50K cycles with less than a 10% change in generated force and resistance at the end of the test. The test parameters were 10 volts, the current was 0.07 A, and an on/off time of 5 seconds/7 seconds respectively. The force was determined by calculating the difference between the upper and lower data boundaries.

Durability testing was used to determine the best combination of parameters for designing a walking structure. We tested an actuator leg that developed the force needed to carry the weight of the batteries, circuits and the structure itself. The actuator leg also needed to move 1 centimeter per step, so that 50K cycles would equal 0.5 Km. The requirements were based on the minimum a robot needed to achieve for the Google lunar x-prize (see http://www.googlelunarxprize.org/). The durability test successfully demonstrated 50K cycles with less than a 10% change in generated force and resistance at the end of the test. The test parameters were 10 volts, the current was 0.07 and an on/off time of 5 seconds/7 seconds respectively. See FIG. 3.

The force was determined by calculating the difference between the upper and lower data boundaries. The lower boundary at the beginning of the test was above 0 because the tip of the polymeric film has an initial pressure on the balance—just as it would with the weight of the robot on it. The first sharp increase at about 2000 cycles was caused by the automatic calibration of the balance. At 25,000 cycles, the initial position of the polymeric film changed slightly. The actuator rested about a millimeter above the balance pan. This might attribute to the most force drop during the measurement, but is still less than a 10% change. The small resistance change that occurred might be due to changes in humidity, structural changes (movement) or loss of metallic nanotubes. The metallic nanotubes are known to carry the majority of the current in nanotube networks. The metallic nanotubes were shown to burn in air when high current was passed through them. The durability of the fast cycling actuators was also tested. An example actuator cycled 1,000,000 times at 30 Hz without any obvious changes (see FIG. 4).

Based on the calculations and experiment results above, at least three design constraints need to be considered for the design of a walking origami robot. One must chose an adequate amount of curvature, force and an operating temperature that allows for durability. A walking robot was made as shown in FIG. 5A. The dimensions chosen for the legs were 3 cm.×1.5 cm.×0.0127 cm. The legs were bent in order to make the walking movement more effective. Many designs were tested, including two, four and six actuating leg designs. The six leg design was setup to allow a tripod of legs not being moved to support the weight of the robot, while the other three legs swept forward and returned to their original position. These two groups of legs were controlled by initially be with Lab View through the 6009 DAQ and relay breakout board. A simple program of on and off times was tested, so that a later design using a 555 timer chip and circuit could be programmed to run the device. The most power hungry design (i.e. one that could carry a heavy battery load) used about 7.5V and 0.23 A to walk. The on/off time were 7 seconds/8 seconds respectively, while the corresponding speed was about 6 cm/min. The next step, we try to set battery and timer chip on it to make the robot independent. Since it could hold several grams weight and use about 6-10V to walk, it is possible to set all devices and battery on it, while each battery with about 1.5V voltage weighs only 200-300 mg and the chip is even smaller. We used the 555 timer circuit to control the power on/off time for the two group legs. Based on the circuit of the 555 timer, we could change the on/off time by change the resistors and capacitors in the circuit so that we could adjust the walk speed and the direction of the robot.

Figure 6A:
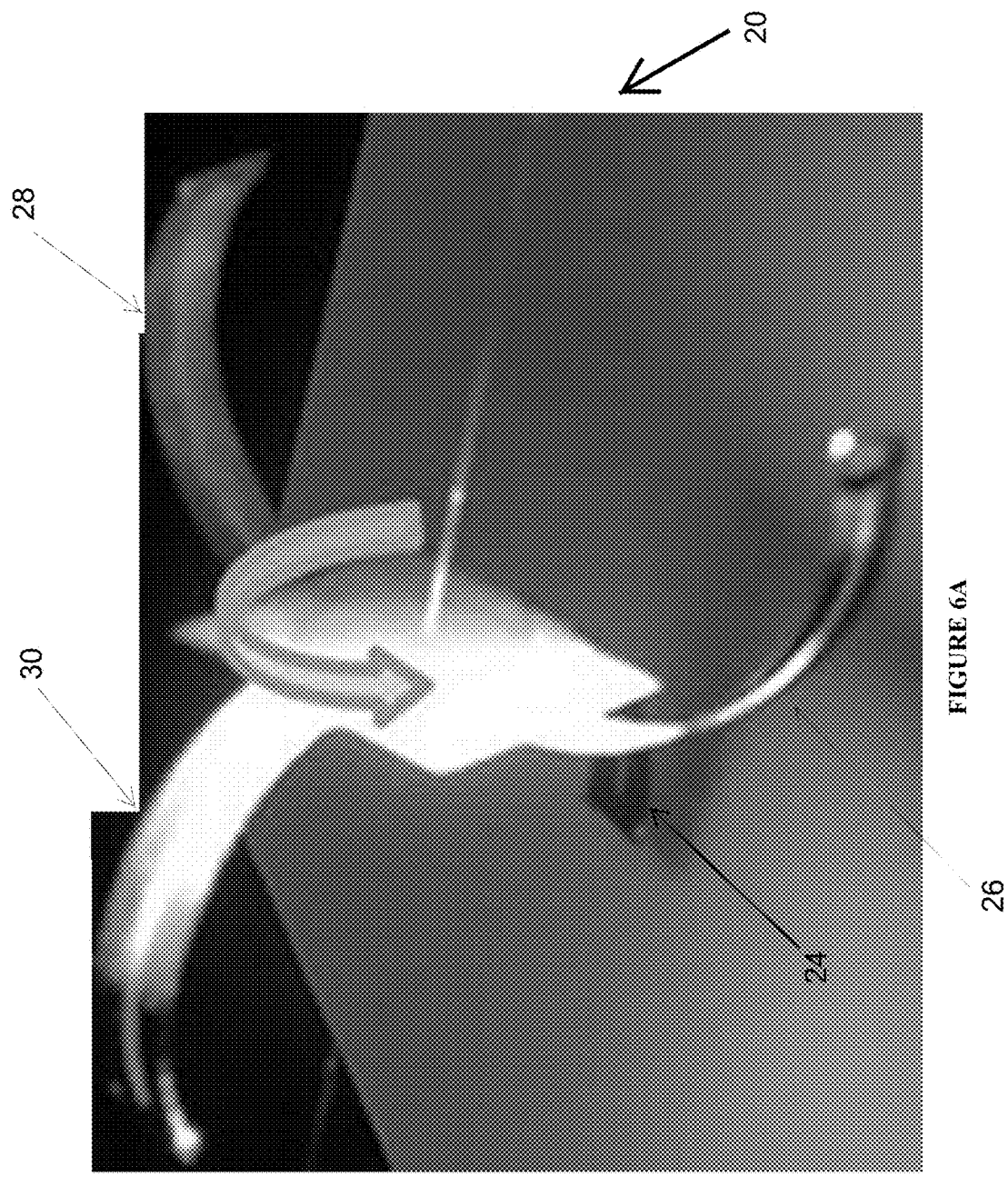
FIG. 6A is a photograph and illustration of a rotating device developed according to the invention. The shape of the exemplary rotating device is a pair of vertex-intersecting parabolas extending away from each other. Each parabola is made of two actuating legs, with very small weights on the ends of two of the legs (on the same side). These small weights offer more driving force when they extend past the center of gravity and introduce a rotational motion by moving the moment out past the wire to create torque. Each leg was coated with carbon nanotubes according to invention processes. As the temperature of one of the legs was increased by a light source, the curved leg became straight by the nanotube actuator's motion. The axis of rotation was determined by a copper wire threaded through the center of the disc.
Figure 6B:
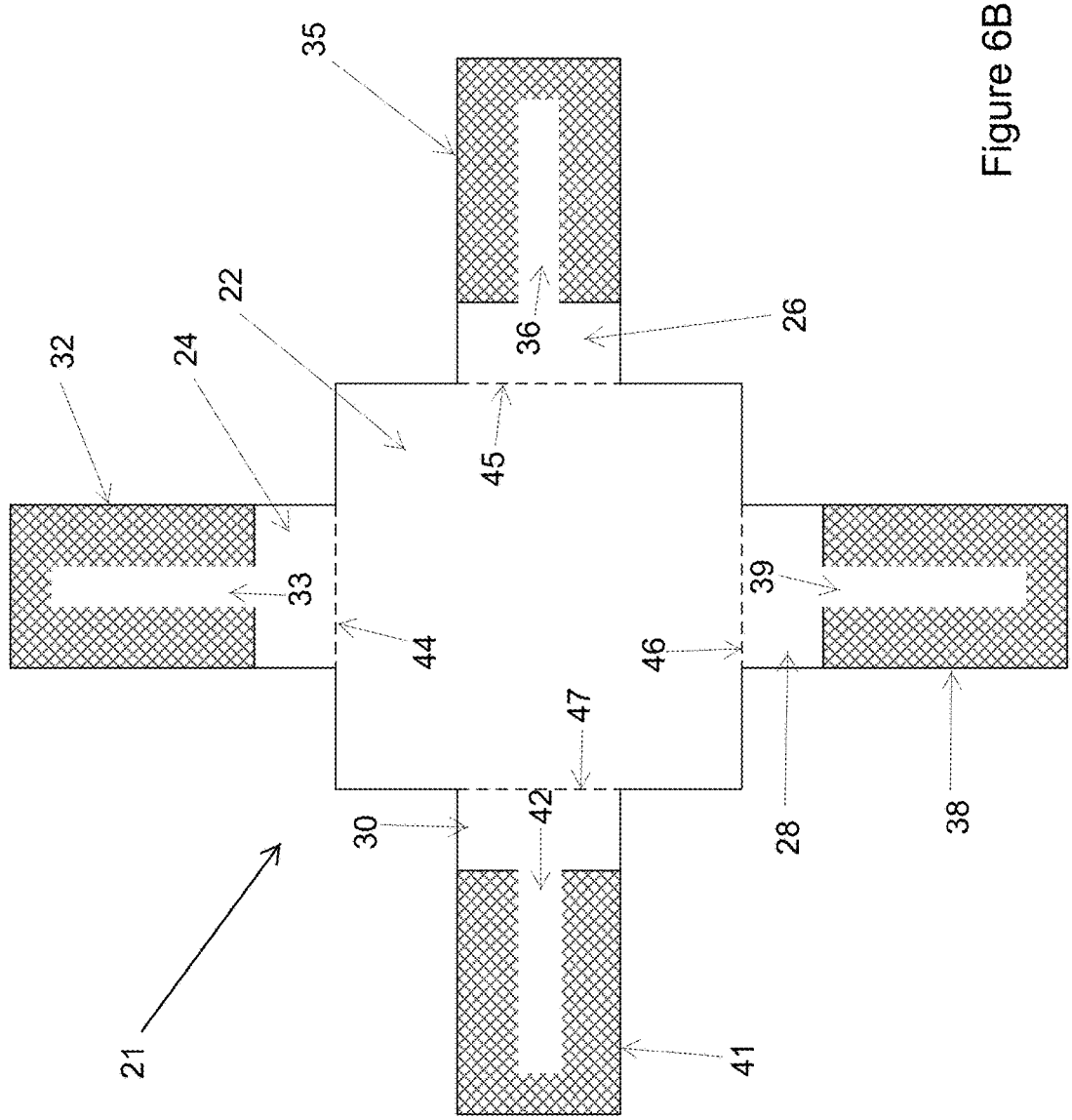
FIG. 6B is a top plan view of an article suitable for folding into the rotating device of FIG. 6A.

The other application developed was a rotating actuator device. Carbon nanotube coatings were printed on an acetal polymeric film. Looking at FIGS. 6A and 6B, there is shown an example rotating device 20 according to the invention. FIG. 6B is a top plan view of a two dimensional article 21 that is folded into the rotating device 20. The rotating device 20 has a body 22 connected to a first leg 24, a second leg 26, a third leg 28, and a fourth leg 30. The first leg 24 has a first U-shaped carbon nanotube coating 32 that defines a first uncoated surface strip 33. The second leg 26 has a second U-shaped carbon nanotube coating 35 that defines a second uncoated surface strip 36. The third leg 28 has a third U-shaped carbon nanotube coating 38 that defines a third uncoated surface strip 39. The fourth leg 30 has a fourth U-shaped carbon nanotube coating 41 that defines a fourth uncoated surface strip 42. The first leg 24, the second leg 26, the third leg 28 and the fourth leg 30 are folded in curves beginning at a first bend line 44, a second bend line 45, a third bend line 46, and a fourth bend line 47 respectively to form a shape of a pair of vertex-intersecting parabolas extending away from each other. Each parabola is made of two legs (i.e., the first parabola is first leg 24 and third leg 28, and the second parabola is second leg 26 & fourth leg 30), with very small weights on the ends of two of the legs (on the same side). These small weights offer more driving force when they extend past the center of gravity and introduce a rotational motion by moving the moment out past the wire to create torque. Each leg was coated with carbon nanotubes to create the U-shaped carbon nanotube coatings 32, 35, 38, 41. As the temperature of one of the legs was increased by a light source, the curved leg became straight by the nanotube actuator's motion. The axis of rotation was determined by a copper wire threaded through the center of the body 22. Now the rotation speed is about 5 seconds per cycle. And this might be used as light driven engine.

Figure 7A:
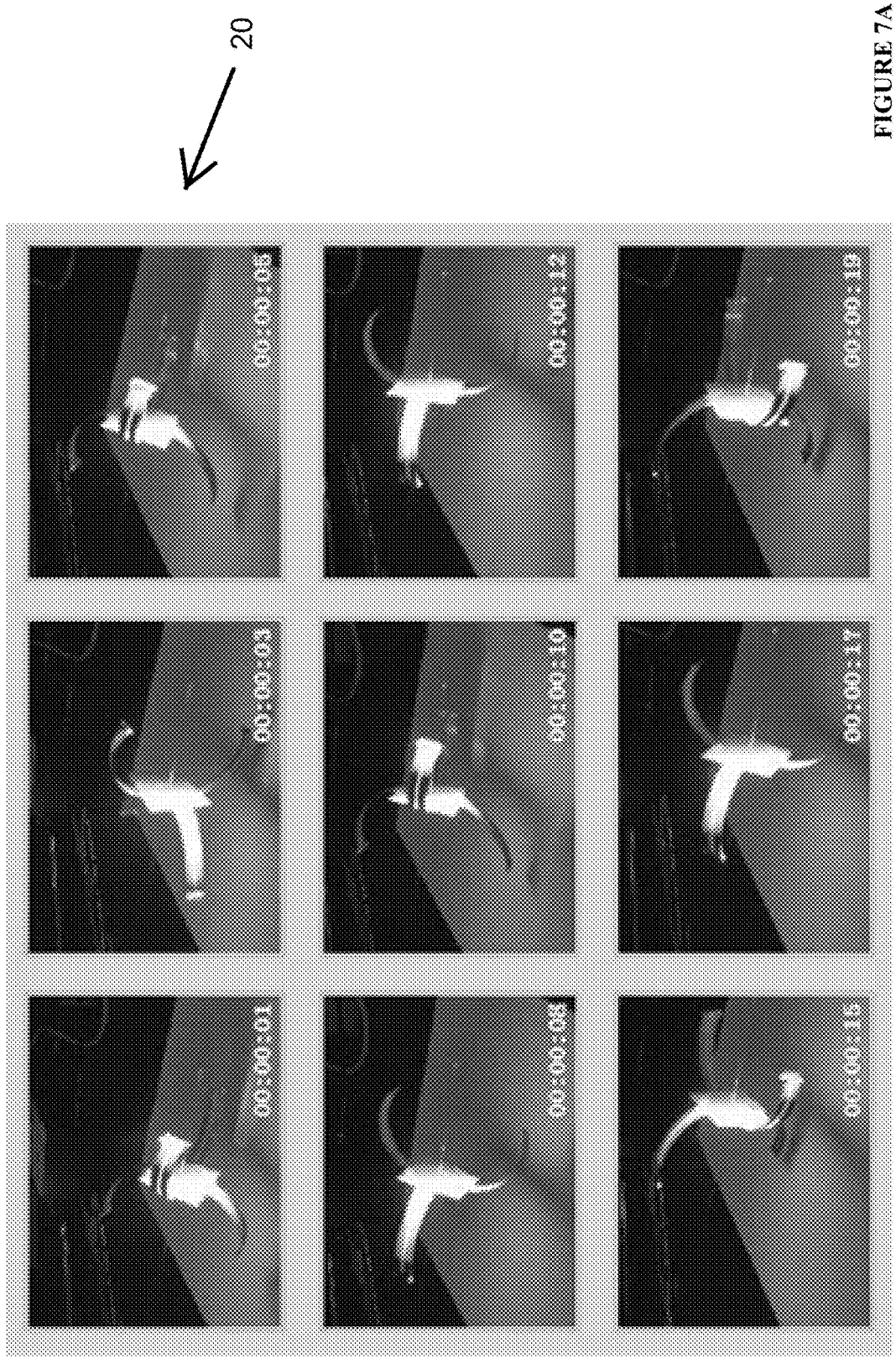
FIG. 7A shows a timed sequence of perspective views (moving left to right in each row, and top row to bottom row) of the rotating device of FIG. 6A while in rotary motion. The robot was powered by heating invention nanotubes (black) with light (300 W Xenon).

The rotating device 20 is also shown in FIG. 7A and was powered by heating the U-shaped carbon nanotube coatings 32, 35, 38, 41 with light (300 W Xenon). The first leg 24 of the rotating device 20 unbends and the copper weight attached to the end is pulled down due to additional torque (radius*force=>arm length*mass*acceleration due to gravity). The other side of the body 22 in the rotating device 20 was in the shade so the third leg 28 cooled and shortened.

Example 2

Figure 7B:
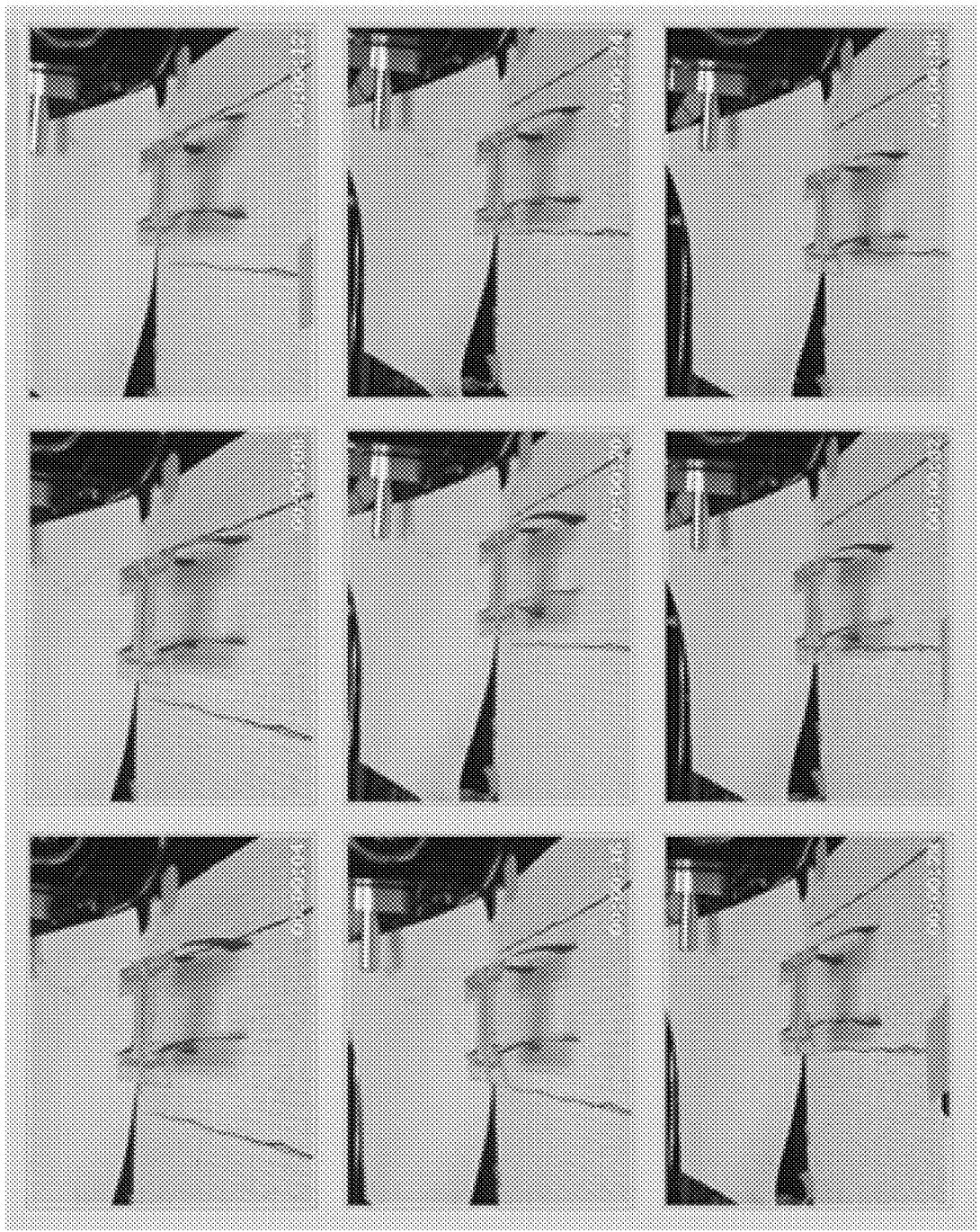
FIG. 7B shows a timed sequence of perspective views (moving left to right in each row, and top row to bottom row) of the walking robot of FIG. 5B while in motion. The robot was actuated by wires connected to a power supply.

The second example device shown in FIG. 7B was actuated by wires connected to a power supply. The control was done by hand by connecting and disconnecting wires to the power supply. In an embodiment, the device was setup for computer control.

Example 3

Figure 8A:
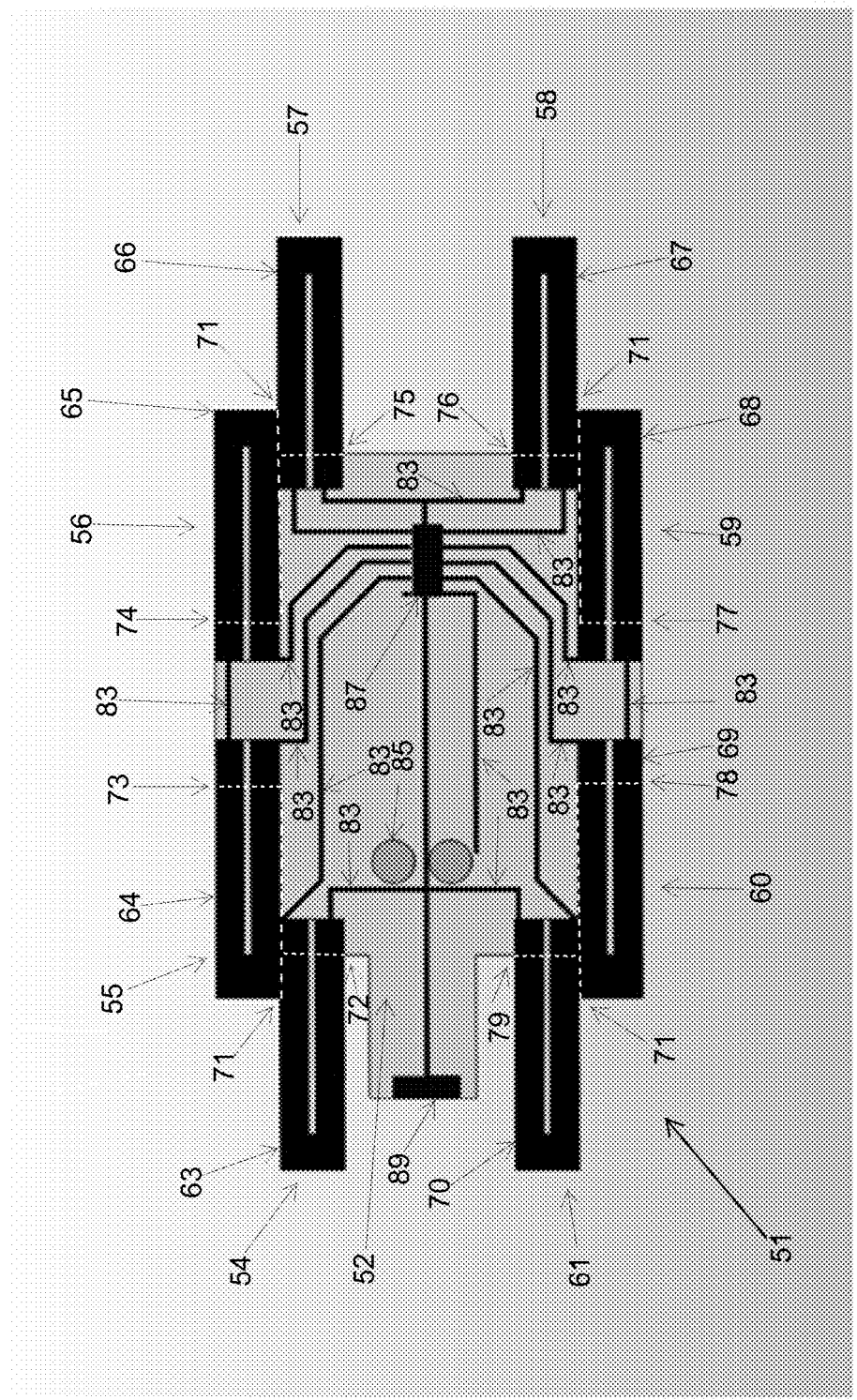
FIG. 8A is a top plan view of a printed article suitable for folding into another walking robot according to the invention.
Figure 8B:
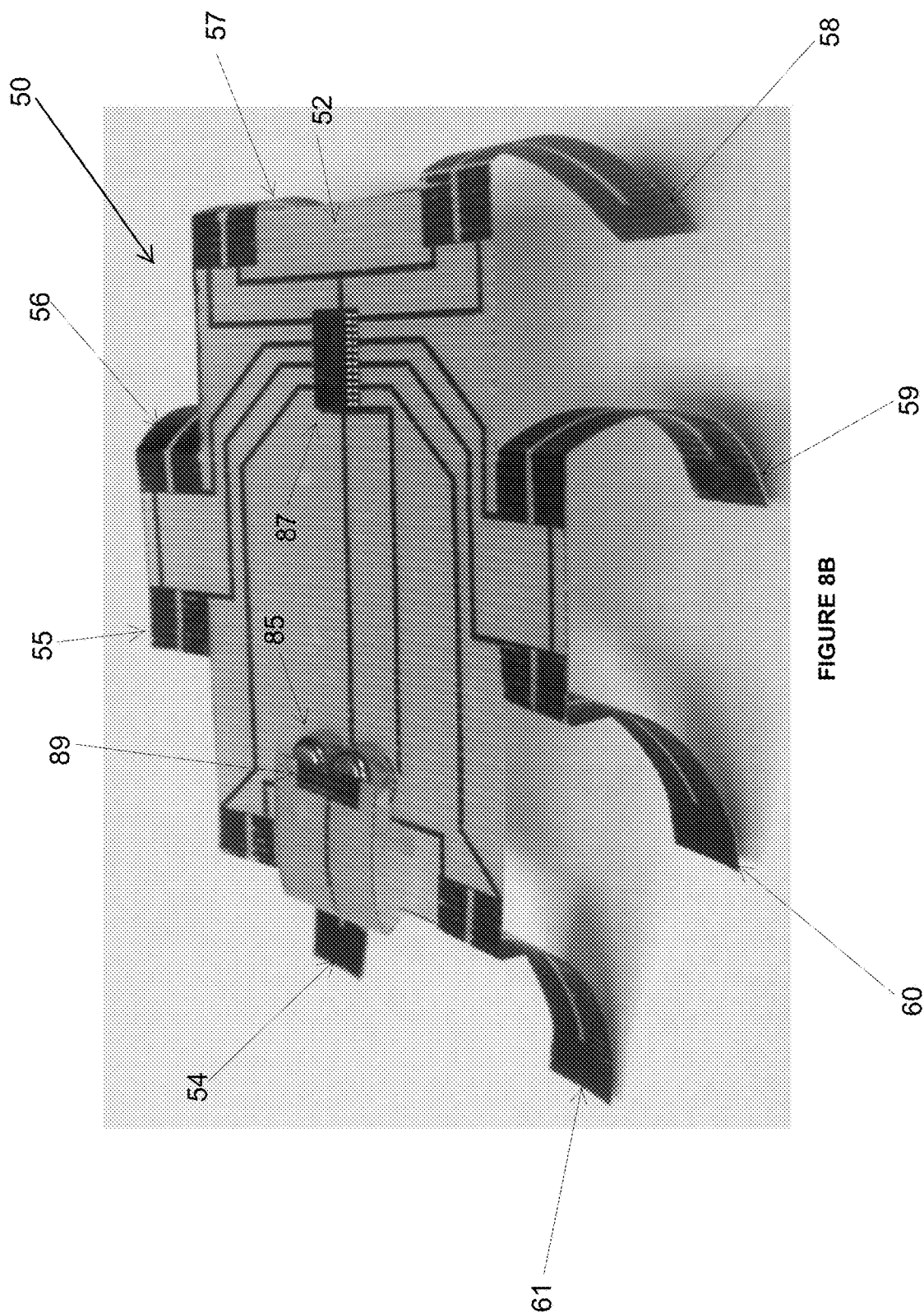
FIG. 8B is a perspective view of a walking robot according to the invention creating by cutting and folding the printed article of FIG. 8A.

Turning now to FIGS. 8A and 8B, FIG. 8A is a top plan view of a laser jet printed article 51 that was folded into the walking robot 50 of FIG. 8B. Carbon nanotube coatings were printed on an acetal polymeric film.

The walking robot 50 includes a body 52 having a first leg 54, a second leg 55, a third leg 56, a fourth leg 57, a fifth leg 58, a sixth leg 59, a seventh leg 60, and an eighth leg 61. Printed on the first leg 54, the second leg 55, the third leg 56, the fourth leg 57, the fifth leg 58, the sixth leg 59, the seventh leg 60, and the eighth leg 61 are a first U-shaped carbon nanotube coating 63, a second U-shaped carbon nanotube coating 64, a third U-shaped carbon nanotube coating 65, a fourth U-shaped carbon nanotube coating 66, a fifth U-shaped carbon nanotube coating 67, a sixth U-shaped carbon nanotube coating 68, a seventh U-shaped carbon nanotube coating 69, and an eighth U-shaped carbon nanotube coating 70, respectively. The article 51 can be arranged into the walking robot 50 by cutting the article 51 along cut lines 71, curving and bending the first leg 54, the second leg 55, the third leg 56, the fourth leg 57, the fifth leg 58, the sixth leg 59, the seventh leg 60, and the eighth leg 61 along a first bend line 72, a second bend line 73, a third bend line 74, a fourth bend line 75, a fifth bend line 76, a sixth bend line 77, a seventh bend line 78, and an eighth bend line 79, respectively. Electrical signal traces 83 place each of the U-shaped carbon nanotube coatings 63, 64, 65, 66, 67, 68, 69, 70 in a circuit with a source of electricity, i.e., batteries 85, and a controller 87 which can be in the form of a timer chip that on/off cycles electrical current to the U-shaped carbon nanotube coatings 63, 64, 65, 66, 67, 68, 69, 70. When folding the article 51, a contact 86 completes the circuit by contacting batteries 85. The type of batteries used is not limited. For example, batteries such as A23, AAAA, AAA, AA, 9V have worked.

Referring to FIG. 9, actuation of the legs 54, 55, 56, 57, 58, 59, 60, and 61 can be explained further. The traces 83 supply direct electrical current from the batteries 85 to positive and negative contacts (shown in FIG. 9) at the end of the U-shaped nanotube coating 63, 64, 65, 66, 67, 68, 69, 70. Electricity flows through the U-shaped nanotube coatings 63, 64, 65, 66, 67, 68, 69, 70 and produces heat (resistive heating). The temperature and low heat capacity of the carbon nanotubes causes a large temperature difference between the nanotubes and the polymeric film of each leg. Heat flows from the nanotube coating to the polymeric film of each leg. The polymeric film temperature increases. Thermal expansion extends the length of the polymeric film of each leg but the nanotube layer adheres to the top of the polymeric film of each leg. The nanotubes do not expand and are held together by strong Van der Walls interactions, i.e., they do not stretch. The top nanotube layer cannot expand as much as the bulk of the polymeric film and therefore the polymeric film of each leg bends towards the nanotubes. When the electricity is turned off, the polymeric film cools. The polymer contracts and returns the actuator to its original shape. The cycle of heating and cooling is controlled by the controller 87.

Example 4

We describe in Example 4 a series of inexpensive, all solid-state, printed active origami (PAO) devices that can be powered by electricity, heat, or light to walk, open/close, or rotate. The actuation can be understood by thermal expansion of the polymer film during Joule heating of the carbon nanotube (CNT)/polymer composite film. The bending is caused by the difference in the thermal expansion coefficients between the carbon nanotube coating and the polymer film. There must also be adequate adhesion between the nanotube layer and the polymer film so that the nanotube layer constrains the movement of the polymer surface that it is in contact with. The thermal expansion coefficient of the polymer (e.g. acetal or polyimide) is roughly 2 orders of magnitude higher than the thermal expansion coefficient of the CNTs (see, Dresselhaus et al., "Electronic, thermal and mechanical properties of carbon nanotubes", Philos. Trans. R. Soc. A 362, 2065 (2004)) and causes the bimorph actuator to curl towards the constrained side when heated. The unique combination of characteristics that comprise this actuation system creates one of the most facile, yet versatile fabrication methods for creating PAO.

Compared to actuators using EAPs that might give similar performance, considering the weight of the entire structure (see, Shahinpoor et al., "Ionic polymer-metal composites (IPMCs) as biomimetic sensors, actuators and artificial muscles—a review". *Smart Mater. Struct.* 7, R15 (1998)), our actuators have some distinct advantages: (i) The low sheet resistance of CNT films allows for the use of low voltages to drive the current needed for electrothermal actuation. This allowed the use of batteries to power the robot. (ii) These actuators were made from common polymer films, rather than electroactive or ferroelectric polymers, highlighting their versatility. (iii) Due to the optical characteristics (see, Kataura et al., "Optical properties of single wall carbon nanotubes", *Synthetic Metals* 103, 2555 (1999)) and excellent electrical conductivity (see, Z. C. Wu et al., "Transparent, conductive carbon nanotube films", *Science* 305, 1273 (2004)) of CNTs, these actuators can also be powered by light, heat, or microwaves. (iv) These actuators were easy to fabricate. In some cases, the conductive inks were painted on by hand. The simple device architecture provided design flexibility that allowed the construction of several different PAO devices.

Bilayer actuators were fabricated by depositing CNT inks on plastic films using several methods. Single-walled carbon nanotubes (Carbon Solutions, P3) were oxidized (see, Rinzler et al., "Large-scale purification of single-wall carbon nanotubes: process, product, and characterization", *Appl. Phys. a-Mater.* 67, 29 (1998)) in order to render them less hydrophobic and easier to disperse compared to un-functionalized CNTs or CNTs grown by chemical vapor deposition. Inks were made by mixing and then sonicating (see, M. J. O'Connell et al., "Reversible water-solubilization of single-walled carbon nanotubes by polymer wrapping", *Chem. Phys. Lett.* 342, 265 (2001)) a 0.1-5% weight ratio (typically 0.3%) of nanotubes in a 1:1 mixture of ethanol and water. A light centrifugation step using a micro-centrifuge at 13,000 g for 30 seconds was performed in some cases to remove large bundles of nanotubes (see, M. J. O'Connell et al., "Band gap fluorescence from individual single-walled carbon nanotubes", Science 297, 593 (2002)). Patterning was achieved using stencils, silk screen printing and/or inkjet printing (details in the "Material and methods" section below). Multiple coatings were used to lower the sheet resistance typically to the single or double digit Ω/□ range. The low sheet resistance allows for a smaller driving voltage to be used to achieve actuation. Other conductive coatings were tested with single digit sheet resistances, as replacements for the single walled carbon nanotubes. Silver paint was too rigid after drying to bend when a voltage was applied. Sputtered gold did not adhere well enough to the substrate to constrain one side and induce curvature.

Figure 10:
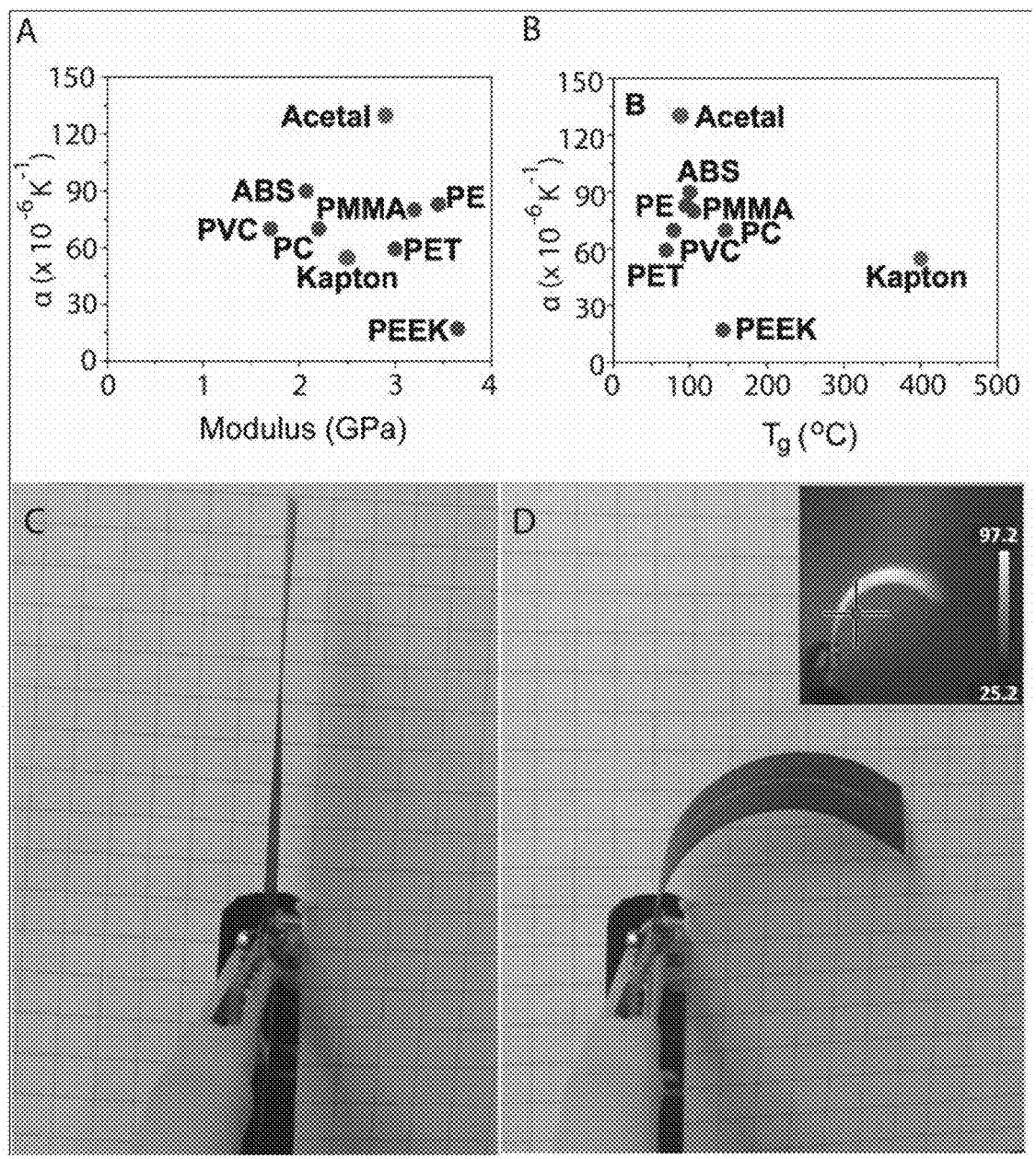
FIG. 10 shows (A) The selection of polymer films was based on the expansion coefficient ($\alpha$) being higher relative to other polymers and the modulus being high enough for the polymer to support its own weight, as a robot, but not so high as to limit movement. Acetal certainly sticks out with its high thermal expansion and midrange modulus. Kapton however does not appear to be different than the other polymer, aside from its midrange modulus. (B) The modulus changes with temperature, so, a second polymer selection criterion was based on the plot of expansion coefficient versus the glass transition temperature. Kapton's high $T_g$ (temperature at which a polymer's modulus rapidly decreases) allowed greater total linear expansion than other polymers. (C) An actuator fabricated using an acetal film substrate, before power is applied to the actuator and (D) deflection after power is applied. (D-inset) Thermal image of the powered actuator showing uniform heating (false color scale depicts temperature in degrees Celsius).

Plastic films were selected as substrates for the patterned nanotube coatings based on several criteria. Selected films had a Young's modulus large enough to retain their shape after being folded like paper origami, and could support their own weight when configured as a walking structure. Various plastic films (with thickness of 76.2, 127 and 254 μm) were selected and tested for actuation based on their high linear coefficients of expansion (a), glass transition temperatures ($T_g$), and melting points (FIG. 10A-B). All plastic films tested, including films not meeting the modulus criteria, produced force and movement. However, polyoxymethylene (acetal) and polyimide (Kapton) films had the best performance, based on properties depicted in FIG. 10A-B (see the "Material and methods" section below for definitions of polymer film abbreviations). An example of an actuator made by this method is shown in FIG. 10C-D.

The actuators were characterized by measuring the force generated for a given power and the maximum force to failure. The force exerted by the actuator is an important characteristic for a walking robot, since it determines how much load it can carry in addition to its own weight. To understand the effect of actuator geometry on the magnitude of the force exerted, several actuators were fabricated with different widths, lengths and thicknesses. The force was determined by considering the actuator as a cantilever (see, Kim et al., "Blocked force measurement of electro-active paper actuator by micro-balance", Sensor Actuat. a-Phys. 133, 401 (2007)) and measuring the force exerted on a Mettler XP205 balance connected to a computer for data acquisition using Lab View, and actuation was controlled through Lab View via a data acquisition card (NI USB-6009 DAQ) connected to a relay breakout board and DC power supply. The DAQ also recorded the signal from a voltage divider circuit, which monitored the resistance of the actuators with time. Further details are provided in the "Material and methods" section below.

Heat-transfer analysis was used to predict the temperature of the actuator as a function of power input. The actuator is modeled as a rectangular cantilever beam comprised of a plastic strip coated with a CNT layer as shown schematically in FIG. 11. The bilayer beam is activated by supplying power, P, to the CNT layer, which causes internal heating and a temperature rise in the CNT. The temperature in the CNT layer is T, and $T_o$ is the temperature of the plastic substrate before activation, and the temperature gradient across the composite beam, $\Delta T=T-T_o$, is given by:

$$\Delta T = \frac{2\pi h d \rho_g}{0.18 l \sigma (m_{CNTL}/h_1)} P \qquad (4.1)$$

where h is the thickness of the composite beam, $\rho_g$ is the density of graphene, d is the diameter and l is the length of CNT, $h_1$ is the thickness, $m_{CNTL}$ is the mass, and σ is the conductance of the CNT-layer on the composite beam. The analysis by Prasher et al. (see, Prasher et al., "Turning Carbon Nanotubes from Exceptional Heat Conductors into Insulators", Phys. Rev. Lett. 102, (2009)) was utilized to compute the thermal conductivity of a 3-D nanotube network and to derive Eq. 4.1. The analysis indicated that the force activation of the CNT-coated plastic film is controlled by the temperature gradient across the composite beam, which in turn depended on heat transfer though single and double junctions in the 3-D CNT network. Details of the derivation of Eq. 1 are presented in the "Material and methods" section below. Using Eq. 4.1, ΔT and T can be computed once the power input, P, is specified. The experimentally obtained CNT layer temperature (T) was determined by using a thermal camera (FLIR-T400) (FIG. 10D, inset) for each applied P and was in close agreement with the theoretical predictions for 3 different actuator widths (FIG. 12A). Moreover, both experimentally derived values for temperature and the calculations (in the "Material and methods" section below) indicate that the temperature on the CNT layer is independent of the width of the composite beam.

The dependence of the force on the dimensions of the actuator is shown in FIGS. 12B-D. The standard actuator had dimensions of 3 cm×1 cm×0.0127 cm and each dimension was correspondingly evaluated. For each dimensional test, only one corresponding dimension was changed. Various widths (0.5, 1, and 1.5 cm) with the same length (3 cm) and thickness (0.0127 cm) are compared in FIG. 12B. A comparison of lengths (2, 3, and 5 cm), using a constant width (1 cm) and thickness (0.0127 cm) is presented in FIG. 12C. The effect of changing the thickness (0.0127 and 0.0254 cm) of the samples is shown in FIG. 12D. In each case, testing was conducted by powering the actuator for 30 seconds in 1V increments in order to reach the steady state temperature ($T_{max}$). Between each power cycle, the actuator was allowed to cool for 30 seconds to ensure a full return to room temperature.

The Timoshenko beam theory (S. Timoshenko, "Analysis of bi-metal thermostats", J. Opt. Soc. Am. Rev. Sci. 11, 233 (1925)) was used to calculate the exerted force, F, and the curvature, ρ, for CNT-coated plastic films under actuation as a function of power input (Details of the force computation are provided in the "Material and methods" section below). The equation for the force is shown in Eq. 4.2, $$F = \frac{kEwh^3 \Delta \alpha}{8L} \left[ \frac{2\pi d \rho_g P}{0.18 l \sigma (m_{CNTL}/h_1)} \right] \qquad (4.2)$$

where k is given by Eq. S11 in the in the "Material and methods" section below, E is Young's modulus, L is the length, and w is the width of the composite beam, and Δα is the difference in the coefficients of linear thermal expansion between the CNT layer and the plastic substrate. The force generated by samples with different dimensions was calculated using Eq. 4.2 and the results are shown in FIGS. 12B-D. In all cases, the computed forces are in good agreement with the measured values at low powers (i.e. low temperatures). Thus, Eq. 4.2 can be used for designing and manipulating the motion of printed active origami made from CNT-coated plastic films simply by controlling the power input. However, for increasing power (temperature), the measured force started to deviate from the theoretical value. This was a result of the temperature being too close to the $T_g$ of the polymer substrate, which induced polymer chain relaxation and structural changes (see, Lendlein et al., "Shape-memory polymers", *Angew. Chem. Int. Edit.* 41, 2034 (2002)). This non-linear behavior observed at high powers indicates that the modulus is decreasing with temperature as indicated in FIG. 12D.

Figure 12:
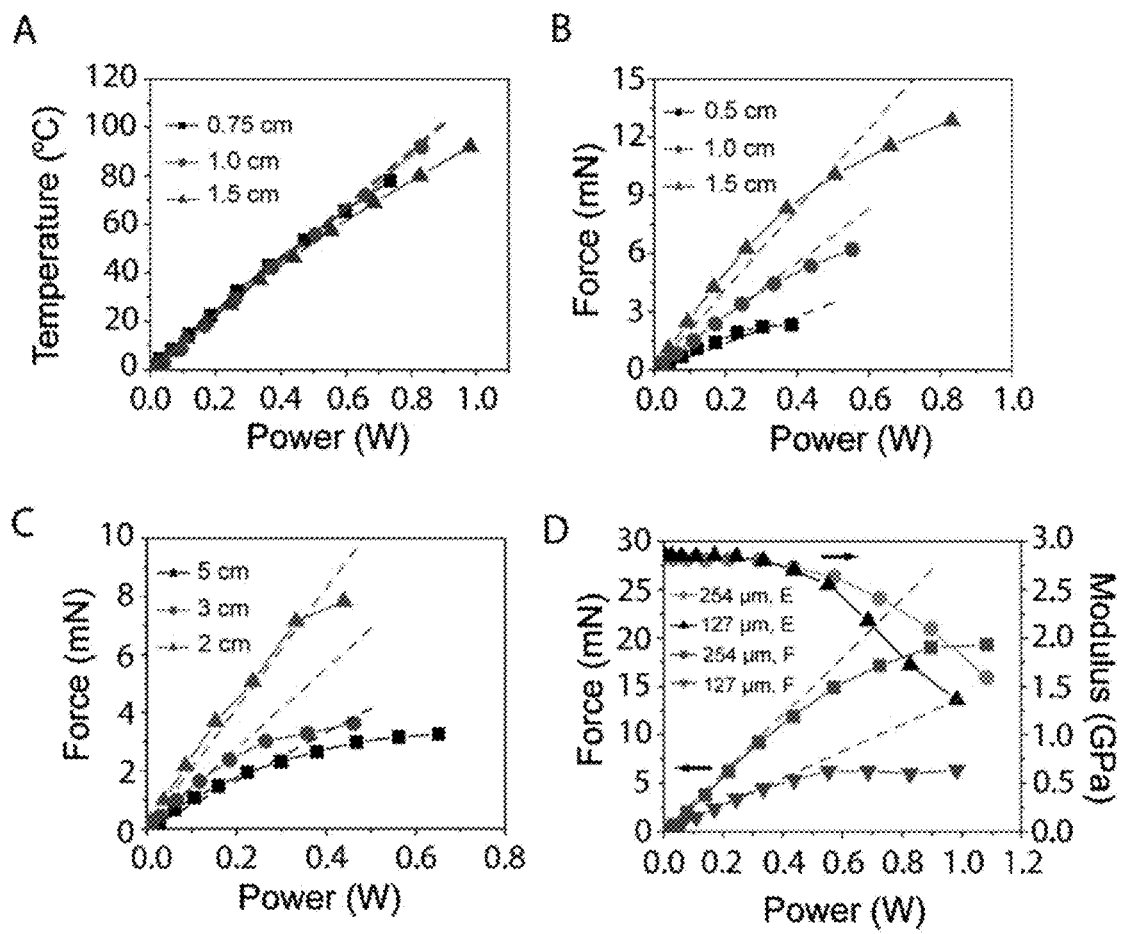
FIG. 12 shows a comparison of experimental (solid) and calculated (dashed) results (A) The temperature generated for actuators with different widths as a function of applied power. (B) The exerted force for different actuator widths as a function of applied power. (C) The exerted force for different actuator lengths as a function of applied power. (D) The exerted force for different actuator thicknesses as a function of applied power (blue and red traces) the modulus change for two samples with different thickness as a function of applied power (black and orange traces).

The experimental data and calculations in FIG. 12 show that the maximum force for a given actuator is achieved for a thick and short design. Conversely, the calculation also revealed that longer and thinner designs provide greater deflection. Actuators demonstrated curvature on both axes of the plastic film plane, but commonly favored curvature primarily perpendicular to the longest dimension. A 2 cm×2 cm×0.0254 cm actuator was fabricated that developed more than 9 g force (0.088 N), as measured on the balance pan, which was 60 times its own weight. The force to weight ratio using actuators with electroactive polymers (EAPs) is often calculated using the force produced over the weight of the conductive coating, while ignoring the weight of the plastic substrate and liquid used for the electrolyte (see, T. F. Otero, "Reactive conducting polymers as actuating sensors and tactile muscles", *Bioinspir. Biomim.* 3, (2008)). In our case, the entire device weight for our actuator is considered.

Figure 13:
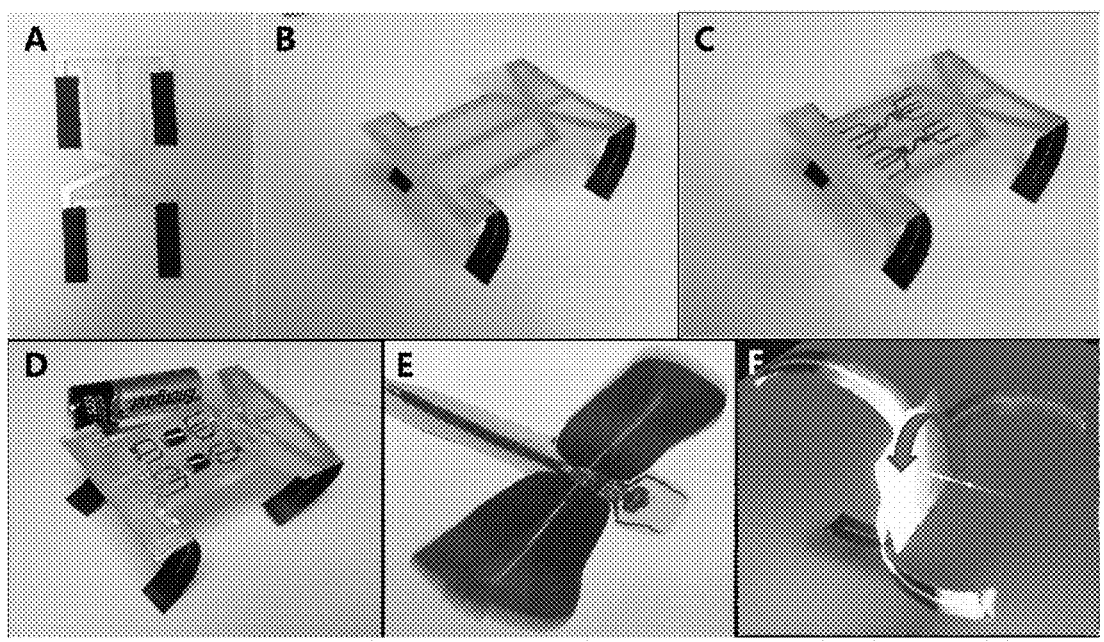
FIG. 13 shows a fabrication process for PAO (A) A robot body was fabricated using a laser cut Kapton stencil coated with adhesive. (B) Silver ink was used as the electrical connection pathways on the main body of the robot. (C) The robot's circuit was made by inkjet printing silver to form the circuit traces on polyethylene naphthalate and then attaching the circuit to the main body of the robot with tape or glue. (D) A printed robot on acetal film with a dual timer chip control circuit powered by an A23 battery. (E) A dragonfly with acetal wings that beat at 20 Hz. (F) A rotating acetal actuator powered by light.
Figure 14:
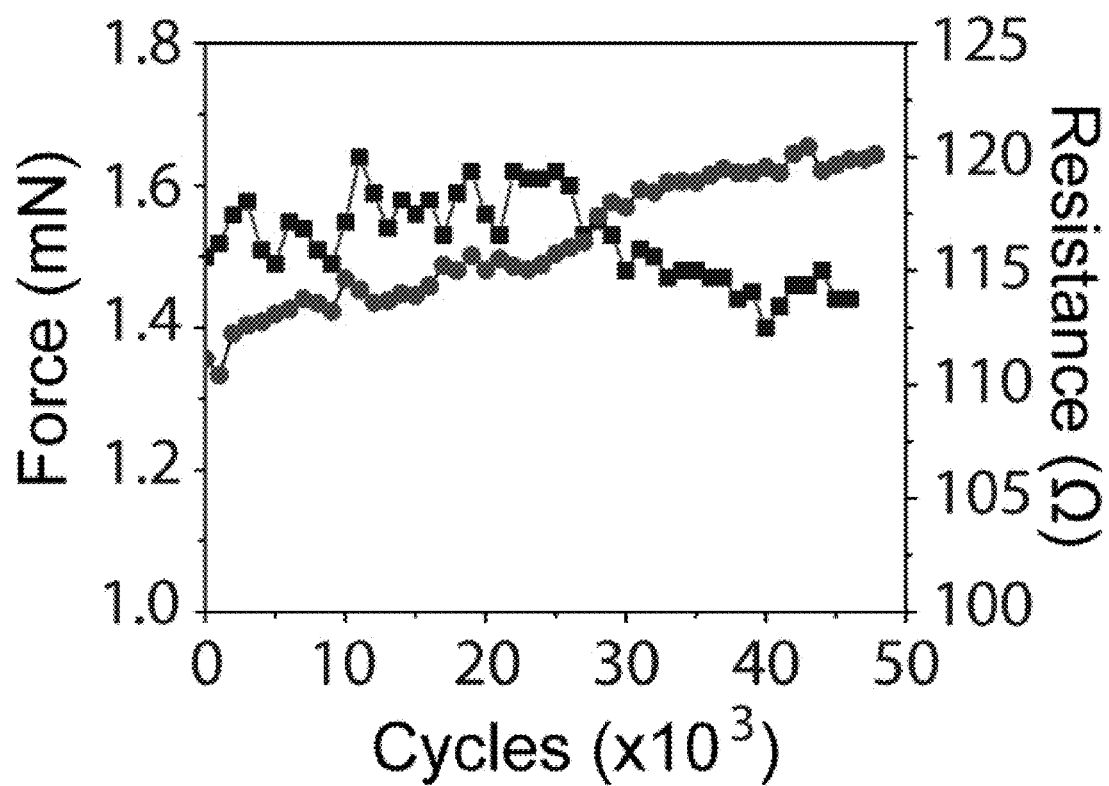
FIG. 14 shows the durability test of the actuator. The measured force (blue) and resistance (red) of an actuator as a function of cycles. The change was less than 10% over the duration of the test.

To determine the durability of these actuators, actuators made from acetal and Kapton were tested for maximum cycling rate (FIG. 14). The voltage was adjusted (15-30V) to heat the samples quickly, with on/off times of tens of milliseconds. The actuators typically reached 20-30 Hz. High actuation rates were possible with thinner films (127 μm or less). The cycling rate was intrinsically limited by the thermal conductivity of the polymer and the film thickness. Nanotube-coated Kapton films were compared to bare films after reaching 300° C. in an oven for several minutes with a thermal camera. The nanotube coated sample cooled faster, although the exact rate was not determined. The increase is expected given the higher surface area that the nanotube coating provides, so the coating modified the thermal transfer rate and contributed to higher frequency actuation. The durability test successfully demonstrated ~50 k cycles with less than a 10% change in generated force and resistance at the end of the test. The test parameters were 10V, the current was 0.07 A and the on/off time was 5 s/7 s, respectively. The durability of the fast cycling actuators was also tested. An example Kapton actuator cycled 1,000,000 times at 30 Hz without any observable changes. A fast actuating (20 Hz) dragon fly was designed and fabricated as shown in FIG. 13E.

To confirm the electrothermally driven actuation mechanism, the CNT/polymer bilayer films were placed in an isothermal environment with uncoated polymer films serving as controls. The CNT/polymer film curved towards the CNT coating, indicating that the CNT layer was under compression and confirming that it is a thermal bimorph actuator. However, heating the CNT film using electrical current made the film bend the opposite way for a very short period of time (visually observed). Without intending to be bound by theory, there are two possible causes for this: (1) the nanotubes heat rapidly due to their high thermal conductivity (see, L. Xiao et al., "Flexible, Stretchable, Transparent Carbon Nanotube Thin Film Loudspeakers", *Nano Lett.* 8, 4539 (2008)) and expand before the polymer is heated. Therefore, the films bend away from the CNT layer initially. (2) The voltage was set higher (12-15V) than the minimum values (1-3V) needed to drive actuation to increase heating rates. The polymer expands closest to the nanotube coating, while the heat is still traveling through the polymer film causing the actuator to bend towards the cooler side. The actuator quickly bends the opposite direction once the heat reaches the entire volume of the plastic film. Thus, the actual actuation mechanism may be more complicated than for a bimetallic system. Based on the calculated and experimental results, three design constraints were considered for fabrication of an active origami robot: (i) deflection distance, (ii) exerted force, and (iii) operating temperature.

An actuator was fabricated that developed the force needed to carry the weight of the circuits and the structure itself, (e.g. about 0.5 grams for small robot in FIG. 13A-D) The actuator also needed to move 1 cm per step, so that 50 k cycles would equal 0.5 kilometers. These requirements were based on the minimum criteria a robot needed to achieve for the Google Lunar X-Prize (www.googlelunarxprize.org). A walking robot was made as shown in FIG. 13D. The dimensions chosen for the actuators (legs) were 2 cm×0.6 cm×0.0076 cm. The robot body was fabricated using a laser cut Kapton stencil coated with adhesive FIG. 13A. Silver ink was used as the electrical connection pathways on the main body of the robot FIG. 13B. The robot's circuit in FIG. 13C was made by inkjet printing silver to form the circuit traces on polyethylene naphthalate and then attaching the circuit to the main body of the robot with tape or glue. This modular method of fabrication was favored over printing the entire device as one unit, as different circuits could be designed and interchanged for the same robot body. In order to make the robot autonomous, a circuit was designed to actuate its legs diagonally in pairs using two 555 timer circuits (see FIG. 15A). The legs were controlled initially with Lab View through the 6009 DAQ and relay breakout board. A simple program of on/off times was tested to determine the best parameters for a very basic onboard control system. The robot was powered by a single 12 V A23 battery, but could also be powered by 2-3 AAA and AA batteries (3-4.5V) and was able to walk 1 cm per step.

Due to their optical absorbance characteristics, the CNTs can also absorb light and convert it to heat (see, Lu et al., "Optically driven nanotube actuators", *Nanotechnology* 16, 2548 (2005)) and serve as multifunctional energy transducers. This was demonstrated by fabrication of a light-driven rotating actuator as shown in FIG. 13F. The shape is a pair of vertex-intersecting parabolas extending away from each other. Each parabola is made of two legs, with very small copper wire weights on the ends of the legs. These small weights offer more driving force when they extend past the center of gravity and introduce a rotational motion by moving the moment out away from the wire to create torque. Each leg was coated with CNTs, which absorbed light and heated the polymer substrate while under irradiation with a 300 W Xenon lamp. The increased temperatures cause the actuator to bend outwards. Upon cooling in the dark, the copper weight was pulled towards the center, thereby letting each leg return to its original position. The axis of rotation was fixed by a copper wire threaded through the center of the disc and the rotation speed was about 5 s per cycle.

The unique combination of characteristics that comprise this actuation system creates one of the most facile, yet versatile fabrication methods for creating PAO. This work will give engineers new approaches for designing active printed electronic systems. These actuators are light-weight, low-cost and enable rapid prototyping. Designs can be created with CAD programs and printed in real time. These new devices are likely to find great utility as actuators, printed robots and active origami. The light weight aspect might allow new satellites and space exploration vehicles to be created at much lower costs of development and deployment. Other innovations will benefit from printed multifunctional and adaptive structures, such as small aircraft design and construction, robotics that are created on demand and 3-D self-folding electronics—all from common plastic films.

Example 4 Materials and Methods

Stencil Mask

Most actuators were made with a stencil mask such as scotch tape cut with a razor blade or a laser-cut stencil secured to the plastic film with adhesive. The plastic substrate was cleaned with acetone or ethanol and dried with compressed air prior to ink deposition. The nanotube inks were deposited by pouring them onto the stencil-patterned plastic films for low viscosity inks or squeegeed in for the high viscosity inks. The ink was then allowed to self-level to the thickness of the tape and dried with a heat gun.

Ink-Jet

The Carbon Nanotubes were dispersed in ethanol, water and 1-cyclohexyl-2-pyrrolidone (CHP) at a 4:4:1 ratio respectively. The CHP helped with wetting characteristics and solution stability. The mixture was sonicated (see, M. J. O'Connell et al., "Reversible water-solubilization of single-walled carbon nanotubes by polymer wrapping", *Chem. Phys. Lett.* 342, 265 (2001)) in room temperature followed by 5 minute 13,000 g centrifuge step to remove large nanotube bundles. The supernatant solvents were evaporated in cases when the concentration of nanotubes was deemed to be too low. This process varied the actual ratio of solvents, so a variety of solvent ratios were actually used. A Dimatix Materials Printer DMP-2800 is used for the ink-jet printing. The accompanying 11610 Dimatix Materials Cartridge has a nozzle size of 22 µm and provided 10 µL per droplet.

Screen Printing

A stencil was made by scoop coating a polyester mesh with Chromaline Chromablue screen printing emulsion. The emulsion was air dried for about an hour. A positive image of the actuator circuit design was printed onto transparency film as the photo-mask. The screen was placed in an exposure unit and exposed to UV light for two minutes to cure the emulsion. The screen was rinsed with water to dissolve any unexposed emulsion. Carbon nanotube ink was deposited on the silk screen and pulled across the image with a plastic squeegee to deposit a thin layer of CNT ink onto the plastic film. The supplies were purchased from Advanced Screen Technologies.

Inks for screen printing were made using the formulations previously described above for stencil and Inkjet patterning techniques. Phase separation was observed with an optical microscope using only a 50:50 water-ethanol solvent mixture. Screen clogging and de-wetting were problems with the water-alcohol mixture. Stability and screen clogging problems were mitigated by centrifuging the inks, then evaporating the solvent to achieve higher concentrations.

Plastic Films and Part Numbers (P/N)

Polyimide (Kapton)—P/N 2271K73, polyoxymethylene (acetal)—P/Ns 5742T31, 5742T11 and 5742T51, polycarbonate (PC)—P/N 85585K102, polyester (PE)—P/N 8567K52, cellulose acetate—P/N 8564K44, Acrylonitrile butadiene styrene (ABS)—P/N 5751T31, polyvinyl chloride (PVC)—P/N 8562K11 and polyether ether ketone (PEEK)—P/N 4671T21, were purchased from McMaster Carr.

2. Temperature and Power Relation of Active Beam Calculation

Figure 11:
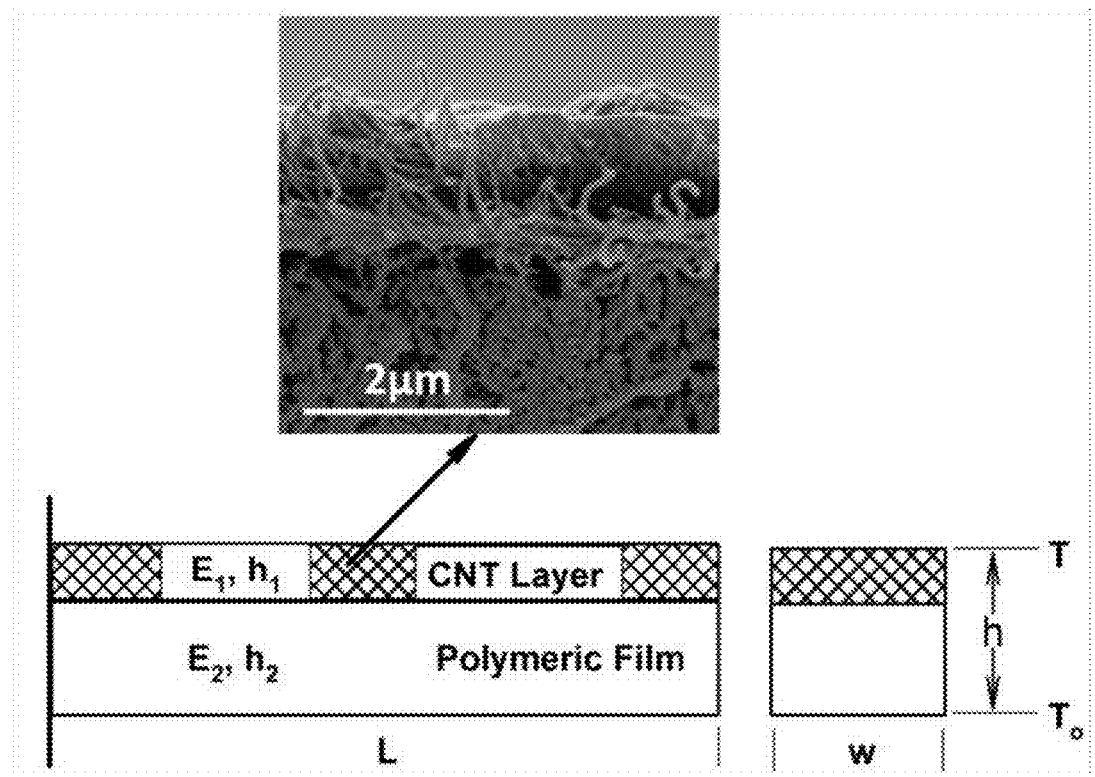
FIG. 11 shows a schematic of a cantilever composite beam comprised of a CNT layer on a plastic film with length L, width w, and thickness h.

The printed active origami is modeled as a rectangular cantilever beam comprised of a plastic strip coated with a CNT layer as shown schematically in FIG. 11. The composite beam is activated by supplying power, P, to the CNT layer, which causes internal heating and a temperature rise in the CNT. The temperature in the CNT layer is T, while the temperature is $T_o$ and the temperature gradient across the composite beam is, $\Delta T = T - T_o$, is given by $$\Delta T = \frac{h}{h'}\frac{1}{A}\frac{\Delta Q}{\Delta t} = \frac{h}{h''}\frac{1}{A}P \tag{S1}$$

where h is the thickness, h' is heat conductivity, A is the area normal to the heat flow, $\Delta Q/\Delta t$ is the heat flux or power, P.

The heat flow through the CNT layer is controlled by single and multiple junctions in the 3-D CNT network, which has been analyzed by Chalopin et al. (see, Y. Chalopin et al., "Upper bound to the thermal conductivity of carbon nanotube pellets", *J. Appl. Phys.* 105, (2009)) and Prasher et al. (see, R. S. Prasher et al., "Turning Carbon Nanotubes from Exceptional Heat Conductors into Insulators", *Phys. Rev. Lett.* 102, (2009)), the thermal conductivity of a CNT network is given by:

$$h' = \frac{0.18l}{2\pi d}\left(\frac{\rho_1}{\rho_g}\right)\sigma \tag{S2}$$

where l is the length and d is the diameter of CNT, $\rho_1$ is the density of the CNT layer, σ is the thermal conductance of a CNT junction, and $\rho_g$ is the density of graphene. Substituting Eq. S2 into Eq. 51 gives $$\Delta T = \frac{2\pi h d \rho_g}{0.18 l \rho_1 A \sigma}P \tag{S3}$$

The density of the CNT layer, which can be written in terms of the mass, $m_{CNTL}$, and the thickness, $h_1$, of the CNT layer, is given by $$\rho_1 = \frac{m_{CNTL}}{h_1 A} \tag{S4}$$

which can be combined with Eq. S3 to give:

$$\Delta T = \frac{2\pi h d \rho_g}{0.18 l \sigma (m_{CNTL}/h_1)}P \tag{S5}$$

and $$T = T_o + \frac{2\pi h d \rho_g}{0.18 l \sigma (m_{CNTL}/h_1)}P \tag{S6}$$

Eq. S6 indicates that the temperature on the CNT layer is independent of the width of the composite beam specimen as observed in the experiment (FIG. 12A).

The thermal conductance of the CNT layer can be obtained by considering that the 3-D CNT network is comprised of a series of single and double junctions (see, Prasher et al., "Turning Carbon Nanotubes from Exceptional Heat Conductors into Insulators", *Phys. Rev. Lett.* 102, (2009)). Heat flow through single junctions is not influenced by other CNTs because the CNTs are widely spaced (>1 μm). In contrast, heat flow through multiple (double) junctions is influenced by other CNTs when the junction spacing is less than the coherence length, which is about 1 μm at 50 Hz (see, Prasher et al., "Turning Carbon Nanotubes from Exceptional Heat Conductors into Insulators", *Phys. Rev. Lett.* 102, (2009)). The CNT network utilized in this study, shown in FIG. 11, is typically comprised of a combination of single junctions and multiple junctions. Thus, the conductance, σ, of the 3-D CNT network can be estimated as $$\sigma = V_{sj}\sigma_{sj} + V_{mj}\sigma_{mj} \tag{S7}$$

where V is the volume fraction; the subscripts sj and mj denote single junction and double junction, respectively. Eqs. S6 and S7 were combined and utilized to compute the temperature of the active beam as a function of power input. All of the material parameters, which are tabulated in Table S1 below, are either measured experimentally or taken from the literature. The theoretical values reported by Prasher et al. (see, Prasher et al., "Turning Carbon Nanotubes from Exceptional Heat Conductors into Insulators", *Phys. Rev. Lett.* 102, (2009)) for the conductance of single and multiple junctions of a 3-D CNT network were used. The only unknown parameters are the volume fractions of the single and multiple junctions in the 3-D CNT network. Fitting the model to the experimental data shown in FIG. 12A provided volume fractions of 14% and 86% for the single junction and multiple junctions, respectively. These values are consistent with the micrograph shown in FIG. 11, which reveals that most the CNT junctions are less than 1 μm while a few are larger than 1 μm apart. The finding suggests that heat transfer in the 3-D CNT network is dominated by multiple junctions.

TABLE S1

Material parameters for the temperature-power computation

| Parameter | Value, unit |
|---|---|
| d | 12 nm |
| h | 127 μm |
| $\rho_g$ | 7.6E−7 kg·m$^2$ |
| $m_{CNTL}/h_1$ | 3.39E−2 kg/m |
| $h_1$ | 1.36 μm |
| l | 1 μm |
| $\sigma_{sj}$ | 50E−12 W/K |
| $\sigma_{mj}$ | 3.5E−12 W/K |

3. Force of An Active Beam

The Timoshenko beam theory (see, Timoshenko, "Analysis of bi-metal thermostats", *J. Opt. Soc. Am. Rev. Sci.* 11, 233 (1925)) was used to determine the force, F, and curvature, ρ, for CNT-coated plastic films. According to this beam theory:

$$F = \frac{3EI}{2\rho L} \tag{S8}$$

$$\frac{1}{\rho} = \frac{6\Delta\alpha\Delta T(1+m)^2}{h\left(3(1+m)^2 + (1-mn)\left(m^2 + \frac{1}{mn}\right)\right)} \tag{S9}$$

where I donates the area moment of inertia (for a rectangle cross section area I=(wh$^3$)/12), ρ the curvature of the actuator, E the modulus of the actuator, w is the width of the actuator, h is the thickness of the actuator, L is the length of the actuator, m the ratio between the thickness of the CNT film and the plastic, n is the ratio of the modulus of the CNT films and the plastic, Δα is difference between the linear thermal expansion coefficients of the CNT film and the plastic, and ΔT is temperature gradient across the thickness of the composite beam. Combining Eq. S8 and S9 leads to $$F = \frac{kEwh^2\Delta\alpha\Delta T}{8L} \tag{S10}$$

$$k = \frac{(1+m)^2}{3(1+m)^2 + (1+mn)\left(m^2 + \frac{1}{mn}\right)} \tag{S11}$$

and the ΔT term can be obtained from Eq. S3. Substituting ΔT into Eq. S10 gives $$F = \frac{kEwh^3\Delta\alpha}{8L}\left[\frac{2\pi d\rho_g P}{0.18l\sigma(m_{CNTL}/h_1)}\right] \tag{S12}$$

which can be used to design and control the deflection of composite beam through the power input, P. For illustration, Eq. S12 was utilized to compute the force response of the composite beam of a CNT layer on an acetal film for various thicknesses, widths, and lengths of the composite beam. The material properties for these computations were obtained from experimental data.

The Young's modulus of CNT films has been reported to vary from 10-100 GPa (see, Coluci, et al., "Mechanical properties of carbon nanotube networks by molecular mechanics and impact molecular dynamics calculations", *Phys. Rev. B.* 75, (2007)). This wide range of values was narrowed by experimentally determining the Young's modulus for 10 sample actuators made in our lab. The actuators were set up as cantilevers. One end of the plastic strip was clamped and small weights were placed on the other end. The deflection was measured with a ruler and recoded along with the value of the weight placed on the end. A graph was made from the plotted data and the slope was determined. The slope of the line was used to calculate the Young's modulus using the equation:

$$E = \frac{1}{3}\frac{gL^3}{sI}$$

where I is area moment of inertia; g=9.81 m/s; s is the slope of stress–strain plot. The modulus (E) was around 2.6 GPa, matching the literature values (see Mark, Physical Properties of Polymers Handbook, Cambridge University Press, 2004) for acetal films and similar for nanotube coated plastic films and bare films. The nanotube coating introduced a change of 10% or less and was not measureable within the experimental error. The nanotube coating thickness was measured by scanning electron microscopy.

The modulus of the acetal and carbon nanotube films are: $E_{acetal} \approx 2.6$ GP, $E_{carbon}=10\text{-}15E_{acetal}$, assuming $E_{carbon}=12E_{acetal}$ then n=12. SEM images were used to determine the nanotube coating thickness (FIG. 11). The carbon nanotube film is about 1/100 of the thickness of the plastic, so m=0.01 therefore k=0.494, from Eq. S11. The expansion coefficient of acetal $\alpha_{acetal}$ is about 110–150× $10^{-6}$/K, taking $\alpha_{acetal}=137\times10^{-6}$/K, in order to fit well with the experimental data. The expansion coefficient of nanotube film is very small (see, Jiang et al., "Thermal expansion of single wall carbon nanotubes", *J. Eng. Mater.—T. Asme.* 126, 265 (2004); and Maniwa et al., "Thermal expansion of single-walled carbon nanotube (SWNT) bundles: X-ray diffraction studies", *Phys. Rev. B* 64, (2001)) compared to that of acetal, $\alpha_{nanotubes} \ll \alpha_{acetal}$, so, $\Delta\alpha \approx \alpha_{acetal}$. A sample with the dimensions L=3 cm, w=1.0 cm, h=0.127 mm, putting all these values into Eq. S12, the force equation becomes F=1.392P. The force generated by samples with different dimensions was calculated using the same Eq. S12 and the results are shown in FIGS. 12B-D. The force response for various thickness values is presented in FIG. 12D. The force response for various widths and various lengths are presented in FIGS. 12B and 12C, respectively. In all cases, the computed forces are in good agreement with the measured values. Thus, Eq. S12 can be used for designing and manipulating the motion of printed active origami made from CNT-coated plastic films simply by controlling the power input.

4. Force Measurement And Durability Cycling Data

The durability of an example actuator (acetal substrate 3 cm×1.5 cm×0.0127 cm) was tested for 50,000 full cycles. Data was recorded for the force and resistance changes with the cycles. The working voltage was 10V and the on/off time to 5 s/7 s respectively, which were based on the requirement of our walking robot. The recorded force changed less than 10% after the ~50 k cycles, shown in FIG. 14.

Figure 15:
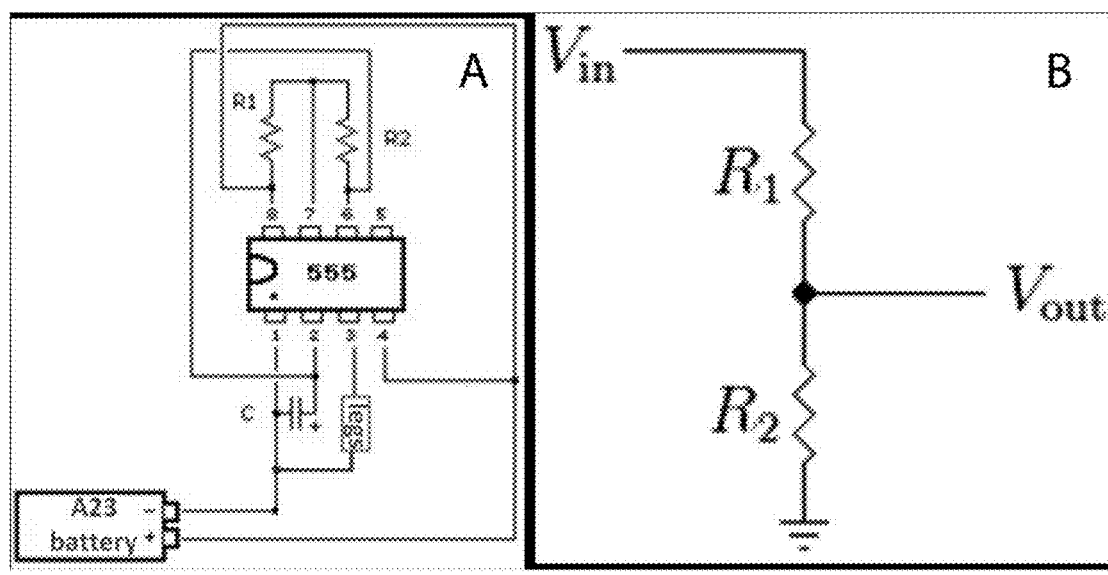
FIG. 15 shows (A) Schematic for the 555 timer chip control circuit for the robot. (B) Voltage divider circuit schematic to measure the resistance of the actuator.

The actuator was setup in a cantilever configuration for the force measurement (see, Kim et al., "Blocked force measurement of electro-active paper actuator by microbalance", *Sensor Actuat. a-Phys.* 133, 401 (2007)) that used a Mettler 205 balance as the force sensor that was connected to a computer serial port and controlled by Lab View software for Mettler balances available on-line. Data acquisition and control of the actuator timing was achieved using Lab-View software with a National Instruments data acquisition card (NI USB-6009 DAQ) connected to a computer via USB. The output signal from the DAQ was sent to a break-out board with relays that switched on to connect the power supply directly to the actuator. The actuators resistance was measured by a voltage divider circuit connected to the DAQ and recorded as voltage ($V_{out}$), as shown in FIG. 15B. The actuator's resistance was calculated using the equation $$R_1 = \frac{R_2 \times V_{in}}{V_{out}} - R_2$$

and the power was calculated using $$P = \frac{(V_{in} - V_{out})V_{out}}{22}.$$

In the circuit, $R_2$ is a resistor with resistance of 22Ω, and $V_{in}$ is the voltage from the power supply. In order to measure the resistance of device, LabVIEW was used to measure the voltage of the divider resistance $V_{out}$.

The small resistance change that occurred might be due to changes in humidity, structural changes (movement) or loss of metallic nanotubes. The metallic nanotubes are known to carry the majority of the current in nanotube networks. The metallic nanotubes were shown to burn in air when high current was passed through them (see, Collins et al., "Engineering carbon nanotubes and nanotube circuits using electrical breakdown", *Science* 292, 706 (2001).

5. Circuits

The robot's circuit in FIG. 15A was made by inkjet printing silver to form the circuit traces on polyethylene naphthalate and then attaching this circuit to the main body of the robot with tape or glue. This modular method of fabrication was favored over printing the entire device as one unit, as mistakes were easier and less time consuming to correct. Two 555 timer chips were programmed with selected resistors ($R_1$=1.2 kΩ and $R_2$=7.48 MΩ) and capacitors ($C_1$=1 μF) to have an on time of 5.2 seconds and an off time of 5.2 seconds. On time was calculated as $(T_{on})$=0.693* (R1+R2)*C and the time off=0.693*R2*C. Larger robots that required higher current than the robot in FIGS. 13A and 15A were controlled by the timer chip's output signal modulating a transistor. The transistor source was connected directly to the battery and the drain was connected to the robot legs. The robot body was fabricated using a laser cut Kapton stencil coated with adhesive. Silver ink was used as the electrical connection pathways on the main body of the robot. Crossed connections were made using tape as the insulator. Carbon nanotubes were used to coat the legs in order to make an actuator. Many designs were tested, including 2, 4 and 6 actuating legs designs. The legs were bent in order to make the walking movement more effective.

Thus, the invention provides electroconductive products and methods of using the electroconductive products to provide printed actuators and devices comprising the actuators. The method allows one to fabricate active origami structures based on nanomaterials printed or deposited on common polymer films. The method enables new two-dimensional and three-dimensional configurable printed electronics. Cheap two-dimensional patterned electronics can find greater functionality by conversion to three-dimensional structures. The idea of taking two-dimensional patterned systems to create new two-dimensional systems will enable new forms of electronics. The invention provides a way to make printed actuators from polymeric films coated with carbon nanomaterials. Self-configuring, rotating and walking origami structures were created using a sheet of polymeric film. The origami structures can be used for self-deploying devices, robotics and other novel active structures. Actuators based on this new concept can move, walk, open, close or rotate when powered to do so. These all-solid-state actuators demonstrated high durability with 50,000 actuation cycles for a slow cycling actuator and 1,000,000 actuations for a 30 Hz actuator without significant loss of performance. The highest force to weight ratio is ~60× so far, and higher ratios are possible.

Robust carbon composite formulations are the key to making not only flexible, but foldable and even creased designs and can be applied to any substrate by solution phase deposition techniques. The carbon composite films are extremely durable and do not suffer from the problems that plague other conductive coatings due to the flexible nature (Young's modulus) of carbon nanotubes and graphene. The coatings will not crack even when subjected to millions of mechanical or thermal actuation cycles.

Herein we describe active origami (i.e. moving) devices made from single sheets of polymer films coated with a layer of conductive material. This work demonstrates a printed robot. The actuator and robot construction methods are believed to be the most facile to date. The devices can be powered by different energy sources that enable movement without changing the structure or design. Locomotion (e.g. a walking robot) in a sheet of plastic coated with a carbon nanotube film has been demonstrated. The results have broad fundamental implications for several fields including printed electronics, polymers, polymer actuators, robotics, aerospace, space exploration, and nanoscience. Specifically, printed robots are of interest, because a single sheet can be folded into the desired shape, rather than trying to individually fabricate and attach together different components. With the help of geometric folding algorithms and computational tools to determine the folding patterns, complex 3-D structures can be realized from 2-D forms essentially allowing for robots with any form, dimension, and feature to be designed. Origami-inspired devices are attractive. However, in order to make functional robots, or "active origami", actuation must be engineered into the origami structures.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A process for preparing an electroconductive product, the process comprising:
    (a) combining from about 0.1% to about 5.0% (w/vol) of an electroconductive material with a mixture comprising water and at least one C1-C6 alcohol;
    (b) sonicating the combination of step (a) for an effective period of time, thereby producing an electroconductive ink coating; and
    (c) applying the sonication product of step (b) on a polymeric substrate whereby the product of step (c) is an electroconductive product.

2. The process of claim 1 further comprising:
    (d) arranging the electroconductive product to form an active origami device.

3. The process of claim 2 wherein:
the active origami device is a robot powered by electricity, heat, and/or light.

4. The process of claim 1 wherein:
the electroconductive material comprises oxidized carbon nanotubes.

* * * * *